(12) United States Patent
Salmenkaita et al.

(10) Patent No.: US 7,072,886 B2
(45) Date of Patent: Jul. 4, 2006

(54) METHOD AND BUSINESS PROCESS TO MAINTAIN PRIVACY IN DISTRIBUTED RECOMMENDATION SYSTEMS

(75) Inventors: Jukka-Pekka Salmenkaita, Helsinki (FI); Antti Sorvari, Itäsalmi (FI)

(73) Assignee: Nokia Corporation, Espoo (FI)

( * ) Notice: Subject to any disclaimer, the term of this patent is extended or adjusted under 35 U.S.C. 154(b) by 624 days.

(21) Appl. No.: 09/950,773

(22) Filed: Sep. 13, 2001

(65) Prior Publication Data

US 2003/0004937 A1 Jan. 2, 2003

Related U.S. Application Data

(63) Continuation-in-part of application No. 09/854,635, filed on May 15, 2001.

(51) Int. Cl.
*G06F 17/30* (2006.01)

(52) U.S. Cl. .................................... 707/4; 707/5; 707/6
(58) Field of Classification Search ................ 707/4, 707/5, 6, 1, 10, 102, 3, 7, 104.1; 709/201, 709/203, 217, 225; 455/11.1
See application file for complete search history.

(56) References Cited

U.S. PATENT DOCUMENTS

| 5,606,617 A | 2/1997 | Brands | 380/30 |
| 5,668,878 A | 9/1997 | Brands | 380/30 |
| 5,696,827 A | 12/1997 | Brands | 380/30 |

(Continued)

FOREIGN PATENT DOCUMENTS

| AU | 200135071 | 10/2001 |
| EP | 0 944 176 | 9/1999 |
| WO | 99/66428 | 12/1999 |
| WO | 01/35253 | 5/2001 |
| WO | 01/35269 | 5/2001 |
| WO | 01/46826 | 6/2001 |
| WO | 01/50299 | 7/2001 |
| WO | WO 02/03626 | 1/2002 |

OTHER PUBLICATIONS

Wireless System for Interacting with a Virtual Space, Sep. 24, 1999, P.D. Schulz.
Bisdikian, et al. "Quests in a thetherless world", Wireless Communications and Mobile Computing, 2002, Wiley & Sons, Ltd., pp. 449–464.
Peddemors et al., "Combining presence, location and instant messaging in a context–aware mobile application framework", Telematica Instituut, Mar. 20, 2002, ppgs. 3–13.

(Continued)

*Primary Examiner*—Jeffrey Gaffin
*Assistant Examiner*—Neveen Abel-Jalil
(74) *Attorney, Agent, or Firm*—Morgan & Finnegan, LLP

(57) ABSTRACT

A distributed recommendation system and method provides greater privacy for user's private data. Tasks of a recommendation system are distributed between wireless devices and network servers, to protect end users privacy. Greater privacy for context-sensitive, adaptive, user interfaces is provided for Internet service usage by wireless devices. The user's wireless device sends a current context-activity pair to a network server in response to either the user's selection of an activity or automatically, while protecting the user's privacy. The user's wireless device includes a service history log. The activities stored in the service history log include past recommendations made by the network server, past services used, prestored service preferences, and special requested service requirements. Context-activity pair information sent to the server protects user privacy and can include any combination of these activities. The server responds to an appropriate recommendation. New recommendations to users are made in response to context-activity pairs submitted by their wireless devices.

14 Claims, 25 Drawing Sheets

U.S. PATENT DOCUMENTS

| | | | |
|---|---|---|---|
| 5,749,081 A | 5/1998 | Whiteis | 707/102 |
| 5,987,099 A | 11/1999 | O'Neill et al. | 379/60 |
| 6,006,200 A | 12/1999 | Boies et al. | 705/26 |
| 6,023,241 A | 2/2000 | Clapper | 342/357.13 |
| 6,041,311 A | 3/2000 | Chislenko et al. | 705/27 |
| 6,044,062 A | 3/2000 | Brownrigg et al. | |
| 6,049,777 A | 4/2000 | Sheena et al. | 705/10 |
| 6,052,467 A | 4/2000 | Brands | 380/279 |
| 6,064,980 A | 5/2000 | Jacobi et al. | 705/26 |
| 6,065,012 A | 5/2000 | Balsara et al. | 707/102 |
| 6,092,049 A | 7/2000 | Chislenko et al. | 705/10 |
| 6,108,493 A | 8/2000 | Miller et al. | 395/200.49 |
| 6,119,101 A | 9/2000 | Peckover | 705/26 |
| 6,138,158 A | 10/2000 | Boyle et al. | 709/225 |
| 6,138,159 A | 10/2000 | Phaal | 709/226 |
| 6,167,278 A | 12/2000 | Nilssen | 455/462 |
| 6,182,050 B1 | 1/2001 | Ballard | 705/14 |
| 6,195,651 B1 | 2/2001 | Handel et al. | 707/2 |
| 6,195,657 B1 | 2/2001 | Rucker et al. | 707/5 |
| 6,199,099 B1 * | 3/2001 | Gershman et al. | 709/203 |
| 6,205,472 B1 | 3/2001 | Gilmour | 709/206 |
| 6,236,768 B1 | 5/2001 | Rhodes et al. | 382/306 |
| 6,243,581 B1 | 6/2001 | Jawanda | 455/432 |
| 6,253,202 B1 | 6/2001 | Gilmour | 707/9 |
| 6,253,203 B1 | 6/2001 | O'Flaherty et al. | 707/9 |
| 6,263,447 B1 | 7/2001 | French et al. | 713/201 |
| 6,275,824 B1 | 8/2001 | O'Flaherty et al. | 707/9 |
| 6,285,879 B1 | 9/2001 | Lechner et al. | 455/432 |
| 6,317,781 B1 | 11/2001 | De Boor et al. | 709/217 |
| 6,321,257 B1 | 11/2001 | Kotola et al. | 709/206 |
| 6,330,448 B1 | 12/2001 | Otsuka et al. | 455/436 |
| 6,414,955 B1 | 7/2002 | Clare et al. | 370/390 |
| 6,421,707 B1 | 7/2002 | Miller et al. | 709/206 |
| 6,430,395 B1 | 8/2002 | Arazi et al. | 455/41 |
| 6,430,413 B1 | 8/2002 | Wedi et al. | 455/442 |
| 6,438,585 B1 | 8/2002 | Mousseau et al. | 709/206 |
| 6,445,921 B1 | 9/2002 | Bell | 455/426 |
| 6,477,373 B1 | 11/2002 | Rappaport et al. | 455/436 |
| 6,493,550 B1 | 12/2002 | Raith | 455/422 |
| 6,510,381 B1 | 1/2003 | Grounds et al. | 701/207 |
| 6,515,974 B1 | 2/2003 | Inoue et al. | 370/331 |
| 6,519,453 B1 | 2/2003 | Hamada et al. | 455/432 |
| 6,527,641 B1 | 3/2003 | Sinclair et al. | 463/39 |
| 6,539,225 B1 | 3/2003 | Lee | 455/436 |
| 6,542,740 B1 | 4/2003 | Olgaard et al. | 455/432 |
| 6,554,707 B1 | 4/2003 | Sinclair et al. | 463/39 |
| 6,580,698 B1 | 6/2003 | Nitta | 370/328 |
| 2001/0021649 A1 | 9/2001 | Kinnunen et al. | |
| 2002/0013815 A1 | 1/2002 | Obradovich et al. | |
| 2002/0015042 A1 | 2/2002 | Robatham et al. | 345/581 |
| 2002/0052873 A1 * | 5/2002 | Delgado et al. | 707/7 |
| 2002/0061741 A1 * | 5/2002 | Leung et al. | 455/414 |
| 2002/0065881 A1 | 5/2002 | Mansikkaniemi et al. | |
| 2002/0083025 A1 * | 6/2002 | Robarts et al. | 706/12 |
| 2002/0094778 A1 | 7/2002 | Cannon et al. | 455/41 |
| 2002/0158917 A1 | 10/2002 | Sinclair et al. | 345/850 |
| 2002/0191017 A1 | 12/2002 | Sinclair et al. | 345/740 |
| 2002/0193073 A1 | 12/2002 | Fujioka | 455/41 |
| 2002/0198882 A1 * | 12/2002 | Linden et al. | 707/10 |
| 2003/0013459 A1 * | 1/2003 | Rankin et al. | 455/456 |
| 2003/0036350 A1 | 2/2003 | Jonsson et al. | 455/41 |
| 2004/0181517 A1 * | 3/2003 | Jung et al. | |
| 2003/0115038 A1 | 6/2003 | Want et al. | 703/24 |
| 2003/0119446 A1 | 6/2003 | Fano et al. | 455/41 |
| 2003/0119494 A1 | 6/2003 | Alanara et al. | 455/421 |
| 2003/0171147 A1 | 9/2003 | Sinclair et al. | 463/39 |
| 2003/0177113 A1 | 9/2003 | Wakita | 707/3 |
| 2003/0208595 A1 | 11/2003 | Gouge et al. | 709/225 |
| 2004/0181540 A1 * | 2/2004 | Jung et al. | |

OTHER PUBLICATIONS http://www.symbian.com/developer/techlib/v70docs/SDL, "How to inquire about services on a remote device", Dec. 31, 2003 1 pg.

U.S. Appl. No. 09/985,044, filed Nov. 1, 2001, Heinonen et al.

U.S. Appl. No. 09/985,192, filed Nov. 1, 2001, Heinonen et al.

U.S. Appl. No. 09/985,193, filed Nov. 1, 2001, Heinonen et al.

U.S. Appl. No. 10/101,688, filed Mar. 21, 2002, Aholainen et al.

U.S. Appl. No. 10/073,200, filed Feb. 13, 2002, Hamberg.

U.S. Appl. No. 09/854,635, filed May 15, 2001, Salmenkaita et al.

Wirless System for Interacting with a Virtual Space, filed Sep. 24, 1999, P.D. Schulz.

* cited by examiner

FIG. 1B

USER'S WIRELESS DEVICE 100

BROWSER 102

REQUEST A RECOMMENDATION:

[5] ENTER SPECIAL SERVICE REQUIREMENTS

[a] AGE REQUIREMENT:
 ALL AGES/CHILD AGE RANGE/ADULTS ONLY
[b] TIME OF DAY REQUIREMENT:
 EARLIEST/LATEST
[c] MAX WALKING DISTANCE
[d] PRICE RANGE
[e] PREFERRED DRESS:
 CASUAL/DRESSY/FORMAL
[f] HANDICAPPED FACILITIES:
 RAMPS/HAND RAILS/REST ROOMS

KEYPAD 104

POSITIONING SENSOR 122 | TOUCH SENSOR 124 | AUDIO SENSOR 125

COMPASS SENSOR 126

AMBIENT LIGHT SENSOR 128

AMBIENT TEMPERATURE SENSOR 132

THREE-AXIS ACCELERATION SENSOR 134

FIG. 1A

USER'S WIRELESS DEVICE 100

BROWSER 102

REQUEST A RECOMMENDATION:

[1] SELECT A SERVICE CATEGORY
[a] AMUSEMENTS        [b] SHOPPING — 225
 GALLERIES             APPLIANCES
 MONUMENTS             AUTOMOBILES
 MOVIES                BEAUTY SALONS
 MUSEUMS               BOOKS
 MUSIC                 CARPETS
 NIGHT LIFE            CELL PHONES
 OUTDOORS/FITNESS      CLOTHING
 RESTAURANTS           COMPUTERS
 THEATER               DAY CARE

KEYPAD 104

POSITIONING SENSOR 122 | TOUCH SENSOR 124 | AUDIO SENSOR 125

COMPASS SENSOR 126

AMBIENT LIGHT SENSOR 128

AMBIENT TEMPERATURE SENSOR 132

THREE-AXIS ACCELERATION SENSOR 134

FIG. 1C

USER'S WIRELESS DEVICE 100

BROWSER 102

REQUEST A RECOMMENDATION:

[6] CHANGE STORED SERVICE PREFERENCES

Select and Edit Current Preferences:
- GALLERIES [modern art]
- MONUMENTS [maritime history]
- MOVIES [family oriented]
- MUSEUMS [technology; natural history]
- MUSIC [jazz]
- NIGHT LIFE [professional sports]
- OUTDOORS/FITNESS [sailing; cycling]
- RESTAURANTS [casual]
- THEATER [orchestral]

KEYPAD 104

| TOUCH SENSOR 124 | AUDIO SENSOR 125 |
| POSITIONING SENSOR 122 | |
| COMPASS SENSOR 126 | |
| AMBIENT LIGHT SENSOR 128 | |
| AMBIENT TEMPERATURE SENSOR 132 | |
| THREE-AXIS ACCELERATION SENSOR 134 | |

FIG. 1D

USER'S WIRELESS DEVICE 100

BROWSER 102

REQUEST A RECOMMENDATION:

[7] CHANGE PRIVACY FILTER SETTINGS

FOR CURRENT REQUESTS:
[a] REMOVE USER NAME
[b] ENTER OTHER DATA TO REMOVE

FOR PAST RECOMMENDATIONS:
[a] REMOVE USER NAME
[b] REMOVE LOCATION OF PAST RECOMMENDATION
[c] REMOVE DATE OF PAST RECOMMENDATION
[d] REMOVE NAME OF PAST SERVICE PROVIDER
[e] ENTER OTHER DATA TO REMOVE

KEYPAD 104

| TOUCH SENSOR 124 | AUDIO SENSOR 125 |
| POSITIONING SENSOR 122 | |
| COMPASS SENSOR 126 | |
| AMBIENT LIGHT SENSOR 128 | |
| AMBIENT TEMPERATURE SENSOR 132 | |
| THREE-AXIS ACCELERATION SENSOR 134 | |

FIG. 2

SERVICE HISTORY LOG 110

PAST RECOMMENDATION & CONTEXT XML FILES 227

```
<?XML VERSION="1.0"?>
<OBJECT>
<DESCRIPTION>Past Recommendation</DESCRIPTION>
<PLACE-EVENTS>Museums</PLACE-EVENTS >
<PAST_RECOMMENDATIONS>
<NAME>History Museum</NAME >
<CONTEXT>
<LOCATION><LAT>[Latitude]</LAT><LON>[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_RECOMMENDATIONS>
</OBJECT>
```

```
<?XML VERSION="1.0"?>
<OBJECT>
<DESCRIPTION>Past Recommendation</DESCRIPTION>
<PLACE-EVENTS>Galleries</PLACE-EVENTS >
<PAST_RECOMMENDATIONS>
<NAME>Fine Art Gallery</NAME >
<CONTEXT>
<LOCATION><LAT>[Latitude]</LAT><LON>[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_RECOMMENDATIONS>
</OBJECT>
```

```
<?XML VERSION="1.0"?>
<OBJECT>
<DESCRIPTION>Past Recommendation</DESCRIPTION>
<PLACE-EVENTS>Monuments</PLACE-EVENTS >
<PAST_RECOMMENDATIONS>
<NAME>Founders Statue</NAME >
<CONTEXT>
<LOCATION><LAT>[Latitude]</LAT><LON>[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_RECOMMENDATIONS>
</OBJECT>
```

PAST SERVICE USED & CONTEXT XML FILES 235

```
<?XML VERSION="1.0"?>
<OBJECT>
<DESCRIPTION>Past Services Used</DESCRIPTION>
<PLACE-EVENTS>Museums</PLACE-EVENTS >
<PAST_SERVICES_USED>
<NAME>Modern Art Museum</NAME >
<CONTEXT>
<LOCATION><LAT>[Latitude]</LAT><LON>[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_SERVICES_USED>
</OBJECT>
```

```
<?XML VERSION="1.0"?>
<OBJECT>
<DESCRIPTION>Past Services Used</DESCRIPTION>
<PLACE-EVENTS>Galleries</PLACE-EVENTS >
<PAST_SERVICES_USED>
<NAME>Artists Museum</NAME >
<CONTEXT>
<LOCATION><LAT>[Latitude]</LAT><LON>[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_SERVICES_USED>
</OBJECT>
```

```
<?XML VERSION="1.0"?>
<OBJECT>
<DESCRIPTION>Past Services Used</DESCRIPTION>
<PLACE-EVENTS>Monuments</PLACE-EVENTS >
<PAST_SERVICES_USED>
<NAME>War Memorial</NAME >
<CONTEXT>
<LOCATION><LAT>[Latitude]</LAT><LON>[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_SERVICES_USED>
</OBJECT>
```

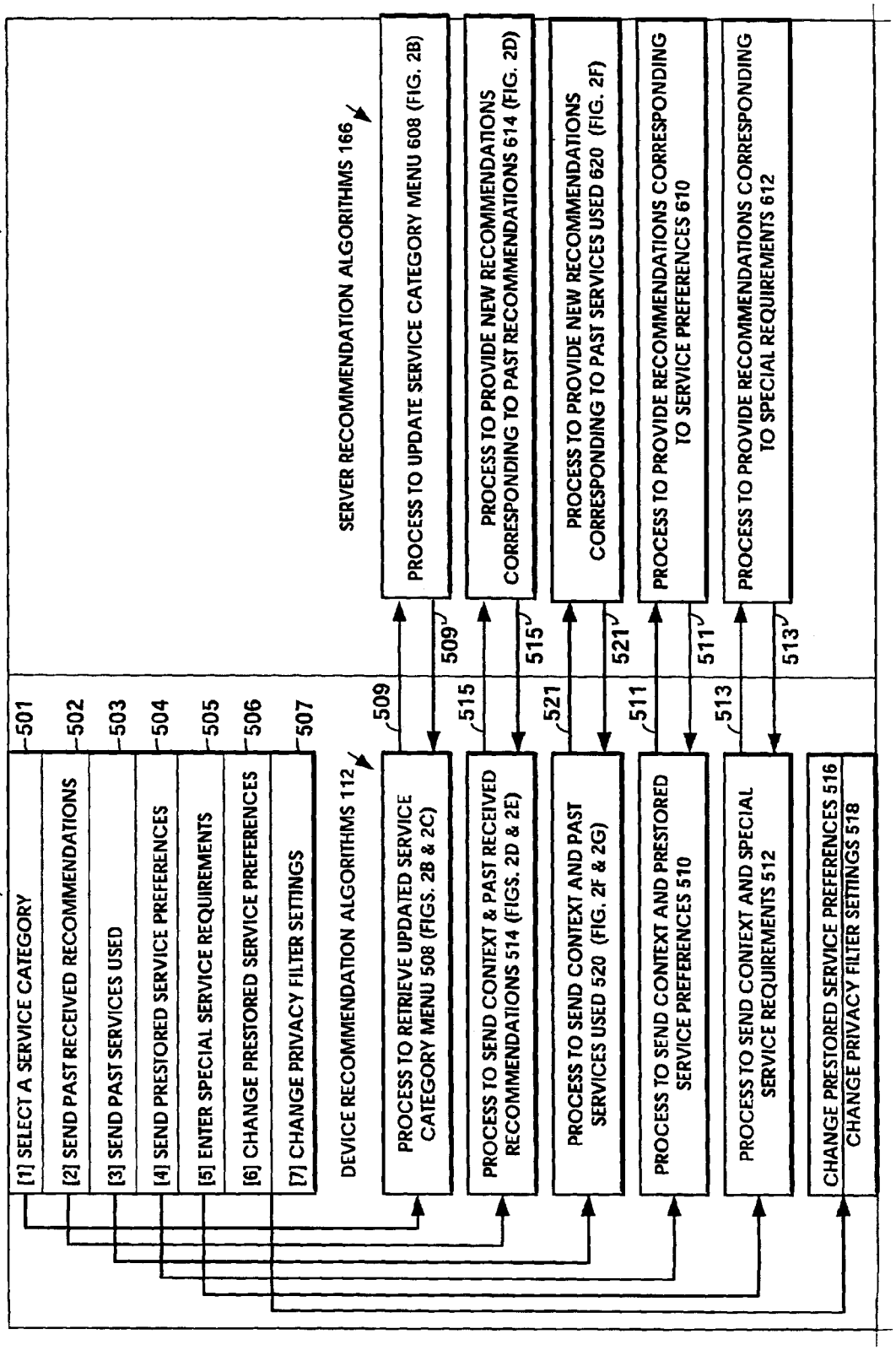

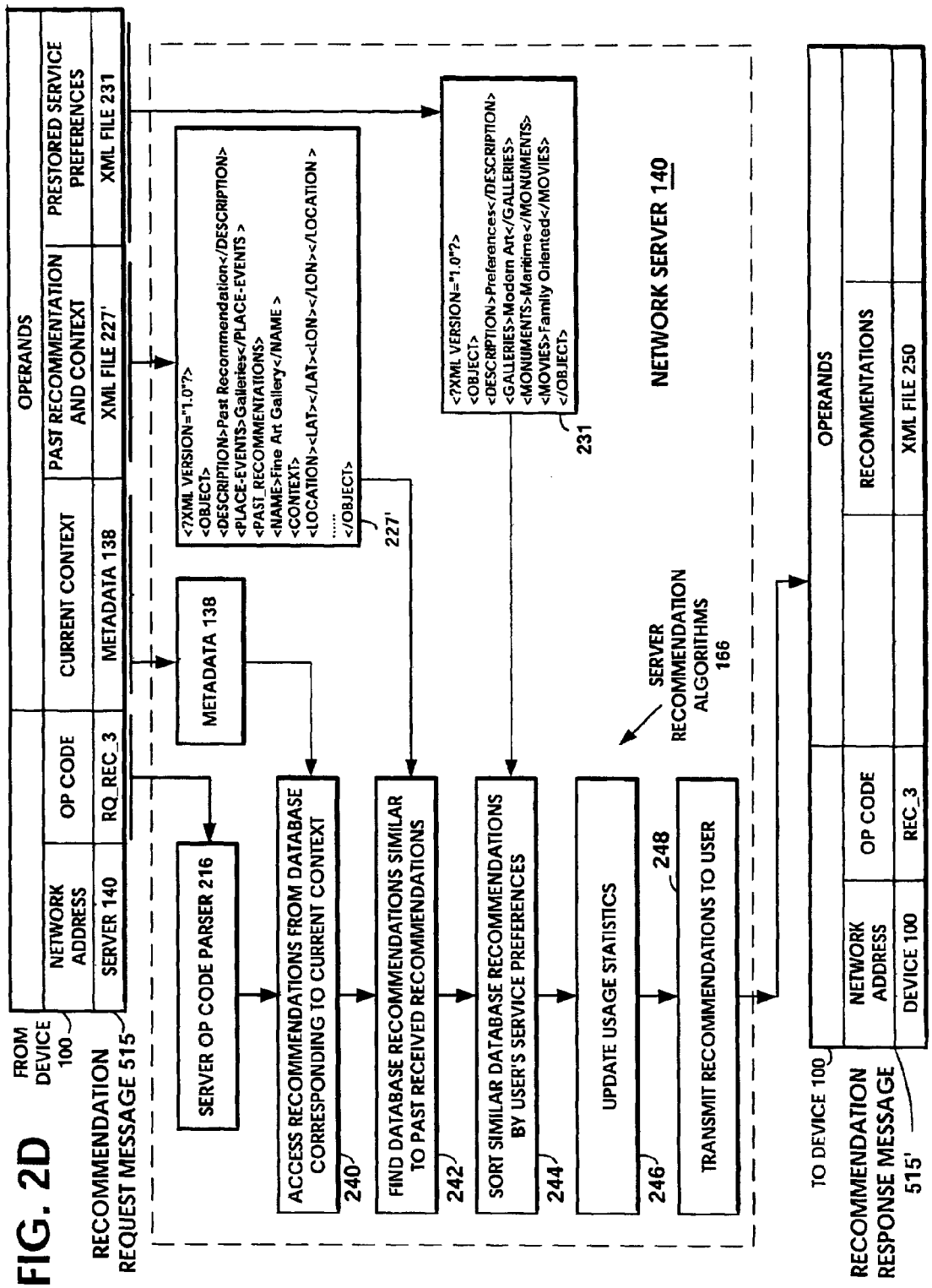

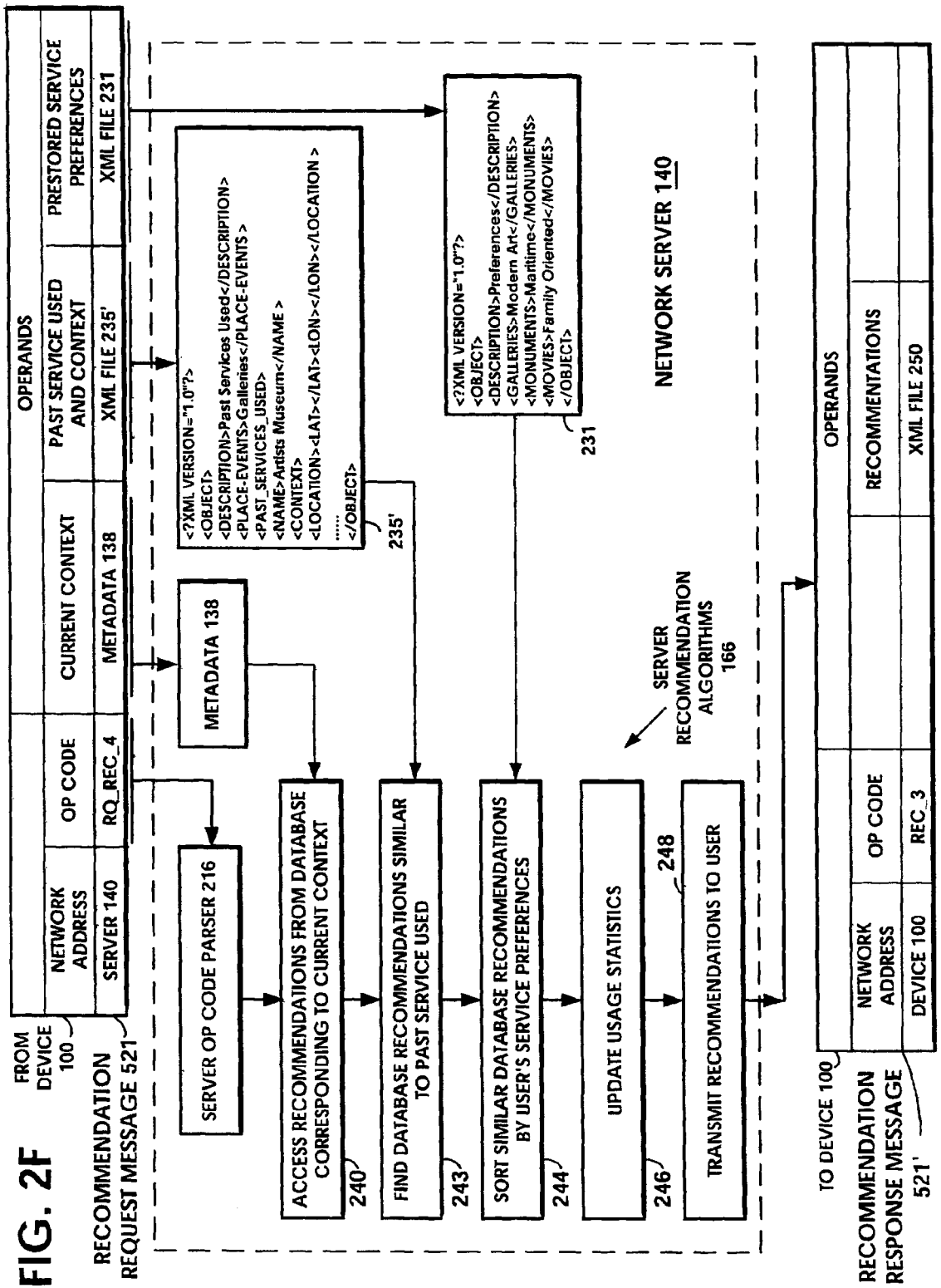

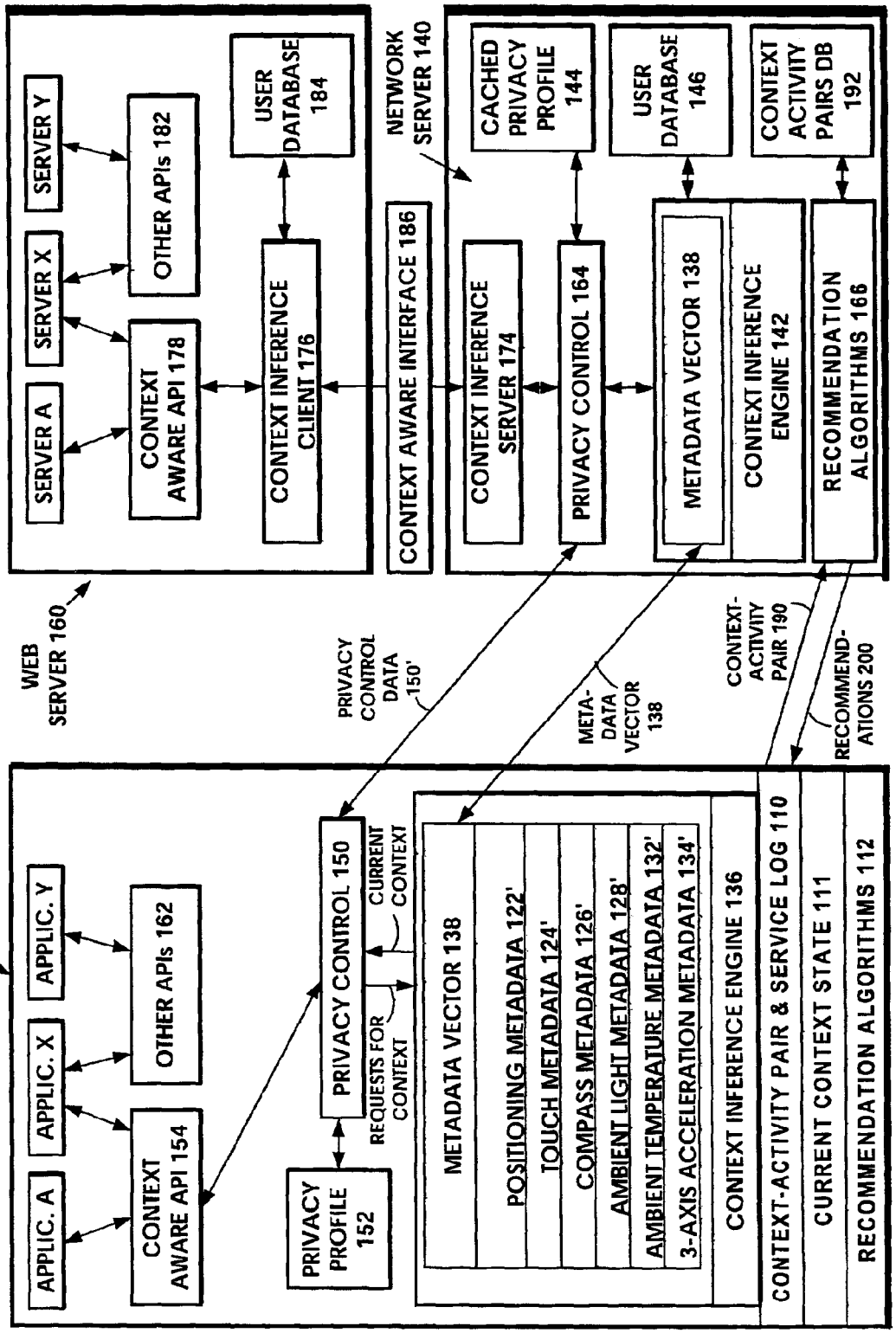

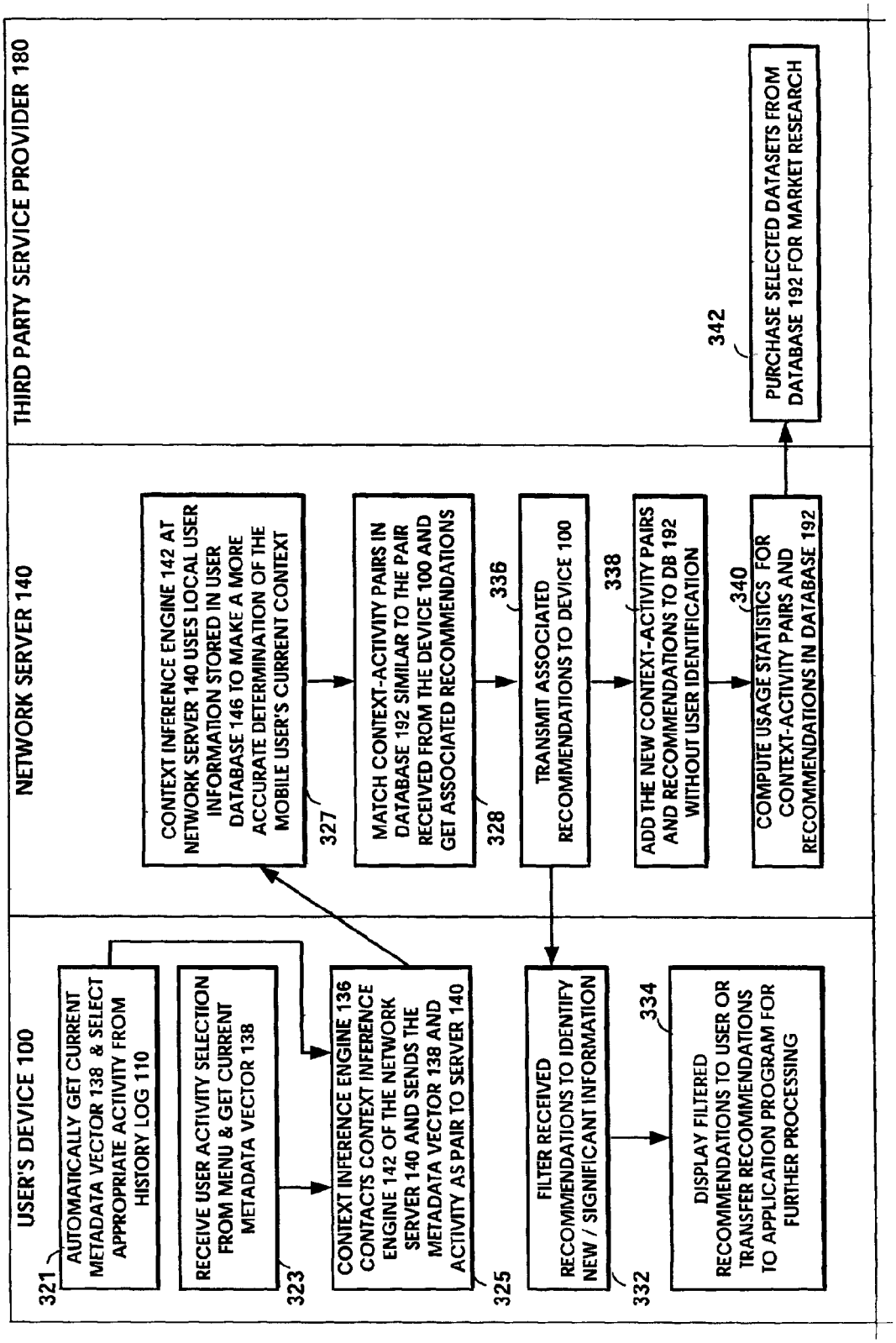

FIG. 6A

CONTEXT-ACTIVITY PAIRS AND SERVICES DATABASE 192 IN SERVER 140

| CONTEXT-ACTIVITY PAIRS | SERVICE RECOMMENDATIONS | NUMBER TIMES RECOMMENDED |
|---|---|---|
| ACTIVITY:<br>  DINING - restaurant<br>CONTEXT:<br>  LOCAL TIME: 6:00 PM - 11:59 PM<br>  LOCATION: Beale St, Memphis TN<br>  LIGHT LEVEL: Night<br>  AMBIENT TEMPERATURE: 15 C - 25 C<br>  SPEED - ACCELERATION: 0 - 50 kph | Joe's Beef Barbecue Restaurant<br>Elvis' Place<br>The Blues Diner<br>The Gourmet Restaurant<br>Dan's Fast Food Restaurant | R=20<br>R=33<br>R=18<br>R=25<br>R=40 |
| ACTIVITY:<br>  DINING - restaurant<br>CONTEXT:<br>  LOCAL TIME: 5:00 AM - 10:59 AM<br>  LOCATION: Beale St, Memphis TN<br>  LIGHT LEVEL: Daylight<br>  AMBIENT TEMPERATURE: 15 C - 25 C<br>  SPEED - ACCELERATION: 0 - 50 kph | Pancake Restaurant<br>Great Start Diner<br>Betty's Homestyle Breakfast<br>Mike's Quick Breakfasts<br>Dan's Fast Food Restaurant | R=120<br>R=100<br>R=130<br>R=150<br>R=120 |
| | | |

FIG. 6B

| CONTEXT-ACTIVITY PAIRS AND SERVICE HISTORY LOG 110 IN DEVICE 100 | | RECEIVE BUFFER IN DEVICE 100 |
|---|---|---|
| CONTEXT-ACTIVITY PAIR HISTORY | HISTORY OF SERVICES USED | RECOMMENDATIONS FROM SERVER |
| ACTIVITY:<br>  DINING - restaurant<br>CONTEXT:<br>  LOCAL TIME: 6:00 PM - 11:59 PM<br>  LOCATION: Beale St, Memphis TN<br>  LIGHT LEVEL: Night<br>  AMBIENT TEMPERATURE: 15 C - 25 C<br>  SPEED - ACCELERATION: 0 - 50 kph | The Gourmet Restaurant [USER'S RATING = 8]<br><br>Dan's Fast Food Restaurant [USER'S RATING = 6] | Joe's Beef Barbecue Restaurant    R=20<br>Elvis' Place    R=33<br>The Blues Diner    R=18<br>The Gourmet Restaurant    R=25<br>Dan's Fast Food Restaurant    R=40 |
| ACTIVITY:<br>  DINING - restaurant<br>CONTEXT:<br>  LOCAL TIME: 5:00 AM - 10:59 AM<br>  LOCATION: Beale St, Memphis TN<br>  LIGHT LEVEL: Daylight<br>  AMBIENT TEMPERATURE: 15 C - 25 C<br>  SPEED - ACCELERATION: 0 - 50 kph | Mike's Quick Breakfasts [USER'S RATING = 8]<br><br>Dan's Fast Food Restaurant [USER'S RATING = 5] | Pancake Restaurant    R=120<br>Great Start Diner    R=100<br>Betty's Homestyle Breakfast    R=130<br>Mike's Quick Breakfasts    R=150<br>Dan's Fast Food Restaurant    R=120 |

METHOD AND BUSINESS PROCESS TO MAINTAIN PRIVACY IN DISTRIBUTED RECOMMENDATION SYSTEMS

This application is a continuation-in-part of U.S. patent application Ser. No. 09/854,635, filed May 15, 2001, entitled "Method And Business Process To Maintain Privacy In Distributed Recommendation Systems", assigned to Nokia Corp.

BACKGROUND OF THE INVENTION

1. Field of the Invention:

The invention disclosed broadly relates to methods for providing Internet services and more particularly relates to improvements in mobile device accessing of Internet recommendation services.

2. Background Art:

Mobile phones and wireless personal digital assistants (PDAS) are able to access the Internet using I-Mode protocol, mobile IPv6 protocol or the Wireless Application Protocol (WAP). Wireless devices can now access Internet applications such as headline news, exchange rates, sports results, stock quotes, weather forecasts, multilingual phrase dictionaries, personal online calendars, online travel and banking services, or download distinctive ringing tones. Broadband wireless networks make it possible for wireless devices to exchange multimedia messages that combine conventional text with much richer content types, such as photographs, images, voice clips, and video clips. Wireless devices can be used to pay bills online using the wireless device as a virtual wallet. Wireless devices can deliver useful and informative advertising and transaction services from online merchants. Wireless devices now also provide entertainment services, such as interactive adventure games, quizzes, and chess tournaments.

Recommendation systems use information of the activity histories or preferences of numerous users to produce useful recommendations for a single user. Existing recommendation systems use collaborative filtering methods to produce recommendations for an individual user by analyzing the actions and preferences of a group of individuals. As the use of information technology has become widespread in all areas of human life, the concerns of individuals over their privacy have increased. Specifically, most distributed recommendation systems were developed for landline Internet services, and the privacy concerns will significantly increase as the services are adopted for use by more personal, wireless devices.

What is needed is a distributed recommendation system that provides greater privacy for the user's private data. What is needed is a way to distribute the tasks of a recommendation system between wireless devices and network servers in a way that protects the privacy of end users. What is needed is a way of creating greater privacy for context-sensitive, adaptive, user interfaces for Internet service usage by wireless devices.

SUMMARY OF THE INVENTION

The invention is a distributed recommendation system that provides enhanced privacy for the user's private data. The invention distributes the tasks of a recommendation system between wireless devices and network servers, so as to protect the privacy of end users. The invention provides enhanced privacy for context-sensitive, adaptive, user interfaces for Internet service usage by wireless devices.

The invention enables a mobile phone or wireless PDA to use context inference techniques to sense the user's environment and in response, to provide a recommendation to the user that is appropriate to the user's perceived environment.

One aspect of the invention is a method that includes the steps of receiving sensor signals characterizing a current environment of a user's wireless device; processing the sensor signals with a context inference engine; outputting a current context result from the processing by context inference engine; and providing a recommendation to the user in response to the current context result. The step of providing a recommendation is embodied as programmed instructions executed in a network server. In accordance with the invention, context-activity pair information is sent to the server without any user identification.

As the user carries about the wireless device, its sensors automatically and continuously measure the geographic location and context of the device. The wireless device periodically transmits the current context in a message over the wireless network to the network server. There are several types of messages, each of which is distinguished by its own unique op code. When the wireless device sends a message containing the current context, the network server parses the op code and responds with information corresponding to the op code, the information being related to the current context. If the op code indicates that the message is a spontaneous message which is automatically transmitted by the device, then the network server responds with information such as a service category menu or prepaid advertising of local services related to the current context.

In another aspect of the invention, the user's wireless device includes a service history log. The activities stored in the service history log are divided into two major categories: past recommendations made by the network server and services. The category of services is broken into three sub-categories: past services used, prestored service preferences, and special requested service requirements. The term "activities" refers to any of these four categories and sub-categories. The service history log stores four component databases: [1] past recommendations and context, [2] past services used and context, [3] prestored service preferences, and [4] special requested service requirements. Context-activity pair information sent to the server can include any combination of these activities.

The wireless device can automatically send messages with a unique op code designating that the message is an automatically transmitted message containing the device's past recommendations and context or the past services used and context, in addition to the current context. The network server parses the op code and uses the device's past recommendations and context or past services used and context to find similar recommendations in its database. The network server then responds with information customized to the user's perceived interests, the information being related to the current context. The database in the network server can include recommendations that have been made in the past to other users in similar contexts. The database can also include services that have actually been used in the past by other users in similar contexts. The network server can respond to the current user with recommendations based on past recommendations made to other users and past services used by other users.

The sensor signals characterizing the current environment of the user's wireless device can be, for example, positioning signals, touch signals, audio signals, compass signals, ambient light signals, ambient temperature signals, three-axis acceleration signals, time signals, or the device's operational mode signals.

In another aspect of the invention, the step of providing a recommendation is embodied as programmed instructions executed within a separate network server in response to context-activity pair signals received from the user's wireless device. A context-activity pair database is maintained by the server which associates context-activity pair information with appropriate recommendations made in the past to many users. As the system makes new recommendations to users in response to context-activity pairs submitted by their wireless devices, the server gathers the new recommendations and adds them to its context-activity pair database. No user personal data is included in the context-activity pair database. In this manner, the variety, quality and pertinence of the recommendations in the context-activity pair database grows as the recommendation system is used. As an added benefit, the server compiles statistical usage information about the recommendations and stores this in the context-activity pair database.

Another aspect of the invention is providing the current context-activity pair to the server in response to either the user's selection of an activity or automatically, and then receiving an appropriate recommendation from the server. In accordance with the invention, recommendations received from the server by the wireless device are filtered to identify new or significant information. The filtering can be done using statistical usage information associated with the recommendations, user ratings associated with the recommendations, or other factors distinguishing one recommendation from another.

In an alternate embodiment of the invention, the current context information accompanying the activity information sent by the wireless device to the network server, is a metadata representation of the sensor signals characterizing the current state of the wireless device. A context inference engine in the network server is embodied as programmed instructions executed within the server. Where the processing power or memory capacity of the wireless device may be limited, the network server can make a more accurate determination of the mobile user's current context. The resultant current context computed by the server and the activity information received from the wireless device constitute the current context-activity pair. The context-activity pair database maintained by the server associates current context-activity pair with appropriate recommendations made in the past to many users. As the system makes new recommendations to users in response to context-activity pairs submitted by their wireless devices, the server gathers the new recommendations and adds them to its context-activity pair database. No user personal data is included in the context-activity pair database. In this manner, the variety, quality and pertinence of the recommendations in the database grows as the recommendation system is used. As an added benefit, the server compiles statistical usage information about the recommendations and stores this in the context-activity pair database.

DESCRIPTION OF THE FIGURES

FIGS. 1A and 1B show the user's wireless device displaying the SELECT SERVICE CATEGORY sub-menu and the ENTER SPECIAL SERVICE REQUIREMENTS sub-menu, respectively.

FIGS. 1C and 1D show the user's wireless device displaying the CHANGE STORED SERVICE PREFERENCES sub-menu and the CHANGE PRIVACY FILTER SETTINGS sub-menu, respectively.

FIG. 2 illustrates the service history log 110, with past recommendation and context files 227 and with past service used and context files 235.

FIG. 2A is a network process diagram showing the interaction of the user's device 100 and the network server 140.

FIG. 2D is a flow diagram of a process in the network server 140 to respond to the recommendation request message from the device 100, by accessing recommendations from the database corresponding to the current context, finding recommendations among those accessed from the database that are similar to the past received recommendations provided in the recommendation request message. The found recommendations are then sorted in accordance with the user's service preferences also provided in the recommendation request message. Then the resultant recommendations are returned to the device 100 in a recommendation response message.

FIG. 2F is a flow diagram of a process in the network server 140 to respond to the recommendation request message from the device 100, by accessing recommendations from the database corresponding to the current context, finding recommendations among those accessed from the database that are similar to the past services used provided in the recommendation request message. The found recommendations are then sorted in accordance with the user's service preferences also provided in the recommendation request message. Then the resultant recommendations are returned to the device 100 in a recommendation response message.

FIG. 3A is a functional block diagram of the wireless device 100, the server 140, and the web server 160, and their interaction when exchanging a metadata vector 138 and privacy control data 150 and when exchanging a context-activity pair and associated recommendations.

FIG. 3D is a network process flow diagram of an alternate embodiment of the invention, in which the context-activity pair information 190 sent by the wireless device to the network server, includes the metadata vector 138. The network server can then assist the wireless device in determining the mobile device's current context, as well as the server sending the resultant service recommendations back to the wireless device.

FIG. 6A shows an alternate embodiment of the context-pairs and services database 192 in the network server 140.

FIG. 6B shows an alternate embodiment of the context-pairs and service history log 110 in the device 100.

DISCUSSION OF THE PREFERRED EMBODIMENT

Figure 1:
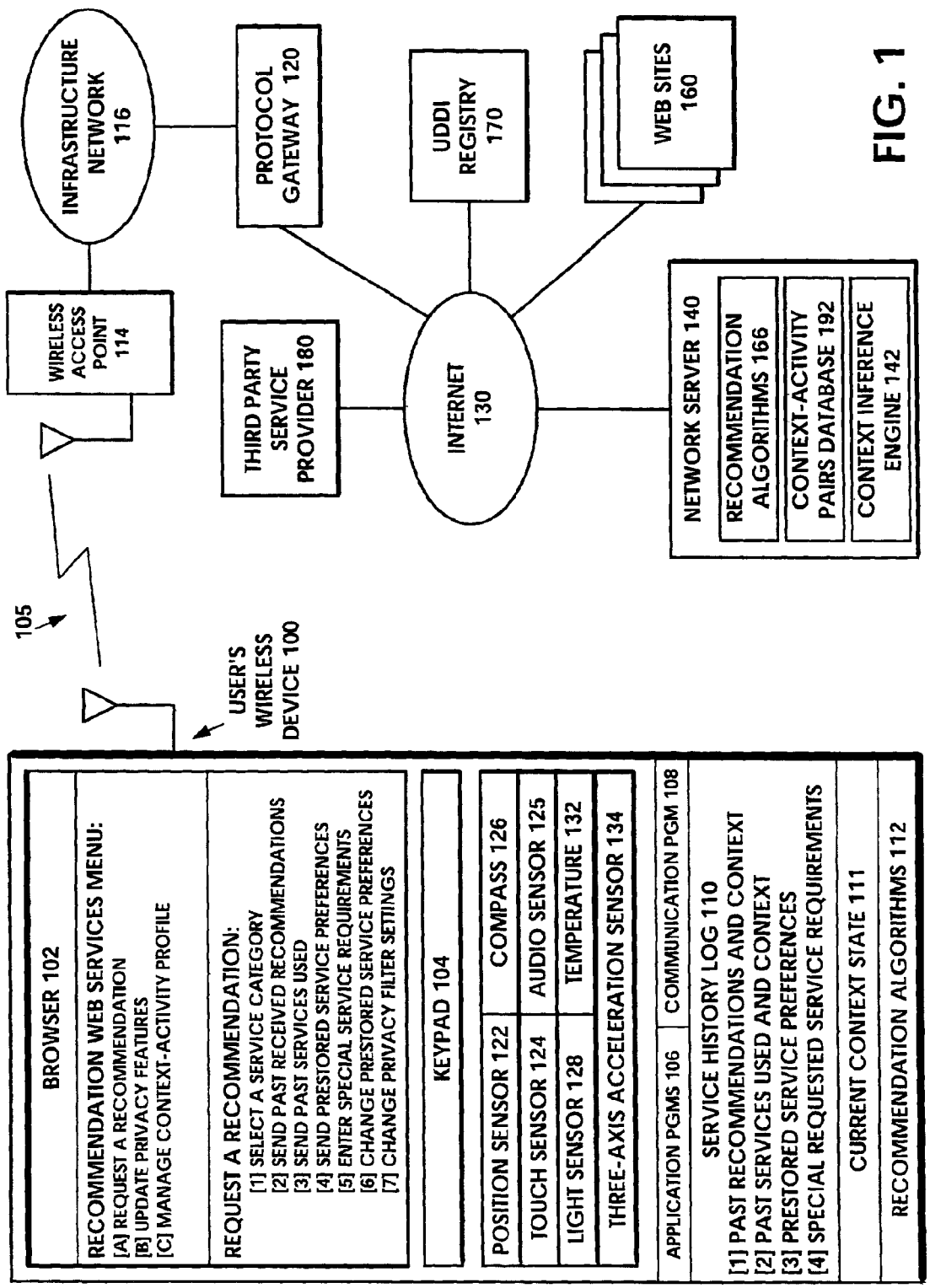
FIG. 1 is a network diagram of the invention, showing an example relationship between the user's portable wireless device, the protocol gateway to the Internet, the network server, a third party service provider, the Universal Description, Discovery and Integration (UDDI) registry, and a plurality of web sites. The Recommendation Web Services menu is shown in the browser of the wireless device.

The portable wireless device 100 of FIG. 1 includes a context sensitive web services feature that enables the wireless device to use context inference techniques to sense the user's environment and in response, to provide recommendations to the user that are appropriate to the user's perceived environment. The portable wireless device 100 offloads to the network server 140 of FIG. 1, some of the computationally intensive computing necessary in context inference techniques. FIG. 1 is a network diagram that shows an example relationship between the user's portable wireless device 100, the wireless access point 114, the infrastructure network 116, the network server 140, and the third party service provider 180 interconnected over the Internet 130. The portable wireless device 100 can be a wireless mobile telephone, pager, two-way radio, smartphone, personal communicator, wireless personal digital assistant (PDA) or the like.

As the user carries about the wireless device 100, its sensors automatically and continuously measure the geographic location and context of the device. The wireless device periodically transmits the current context in a message over the wireless network to the network server 140. There are several types of messages, each of which is distinguished by its own unique op code. When the wireless device sends a message containing the current context, the network server parses the op code and responds with information corresponding to the op code, the information being related to the current context. If the op code indicates that the message is a spontaneous message which is automatically transmitted by the device 100, then the network server 140 responds with information such as a service category menu or prepaid advertising of local services related to the current context.

In FIG. 1, the user's wireless device 100 includes a service history log 110. The activities stored in the service history log 110 are divided into two major categories: past recommendations made by the network server 140 and services. The category of services is broken into three sub-categories: past services used, prestored service preferences, and special requested service requirements. The term "activities", as used herein, refers to any of these four categories and sub-categories. The service history log 110 stores four component databases: [1] past recommendations and context, [2] past services used and context, [3] prestored service preferences, and [4] special requested service requirements. The user's wireless device 100 includes application programs 106, current context state 111 and recommendation algorithms 112. An example is shown in FIG. 2 of the two component databases: [1] past recommendations and context and [2] past services used and context.

The wireless device 100 can automatically send messages with a unique op code designating that the message is an automatically transmitted message containing the device's past recommendations and context or past services used and context, in addition to the current context. The network server parses the op code and uses the device's past recommendations and context or past services used and context to find similar recommendations in its database. The network server 140 then responds with information customized to the user's perceived interests, the information being related to the current context.

The user of the wireless device 100 can also manually enter requests for menus and recommendations related to the current context. The wireless device 100 then sends messages with a unique op code designating that the message is a manual request by the user containing the device's past recommendations and context or past services used and context, in addition to the current context. The network server parses the op code and uses the device's past recommendations and context or past services used and context to find similar recommendations in its database consistent with the user's manual request. The network server 140 then responds with information customized to the user's expressed interests, the information being related to the current context.

The service history log 110 can accumulate data on past services used by the user of the device 100 in several ways.

The service history log 110 can be programmed to capture on-line ticket purchase information for services. The service history log 110 can also be programmed to monitor the dwell-time of the device at scheduled events and to draw the inference that the user is in fact attending the scheduled event. The event and the current context are then stored in the database [2] past services used and context, in the service history log 110.

The network 105 formed by the wireless device 100, wireless access point 114, and infrastructure network 116 can be implemented as a digital wireless wide area network (WAN), based on architectures such as Global System for Mobile Communication (GSM), IS-136 TDMA-based Digital Advanced Mobile Phone Service (DAMPS), Personal Digital Cellular (PDC), IS-95 CDMA-based cdmaOne System, General Packet Radio Service (GPRS) and broadband wireless architectures such as W-CDMA and Broadband GPRS. For more information on these digital wireless, wide area network architectures, see the book by Yi-Bing Lin, et al. entitled *Wireless and Mobile Network Architectures*, John Wiley & Sons, 2001. The network 105 can also be a short-range wireless system connected to a wide area landline infrastructure network such as the Internet 130. Short-range wireless systems include both wireless personal area network ("PAN") and wireless local area network ("LAN"). Both of these networks have the common feature of operating in unlicensed portions of the radio spectrum, usually either in the 2.4 GHz Industrial, Scientific, and Medical (ISM) band or the 5 GHz Unlicensed-National Information Infrastructure ("U-NII") band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. The Bluetooth Special Interest Group, *Specification Of The Bluetooth System*, Version 1.0B, Volumes 1 and 2, December 1999, describes the principles of Bluetooth device operation and communication protocols. Wireless local area networks generally operate at higher peak speeds of from 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPER-LAN Standard, which operates in the 5 GHz U-NII band. For more information on wireless LANs, see the book by Jim Geier entitled *Wireless LANs*, Macmillan Technical Publishing, 1999. The network 105 formed by the wireless device 100, wireless access point 114, and infrastructure network 116 can use a wireless communications protocol, such as the Wireless Application Protocol (WAP), the I-Mode protocol, or the mobile IPv6 protocol.

FIG. 1 shows the user's wireless device 100 communicating over a radio link with the wireless access point 114, which is connected to a wireless network 116, which is connected to a protocol gateway 120. The gateway 120 is connected over the Internet 130 to the server 140. The wireless device 100 of FIG. 1 also has a plurality of sensors for sensing the mobile user's ambient conditions. The sensors shown include POSITIONING SENSOR 122, TOUCH SENSOR 124, AUDIO SENSOR 125, COMPASS SENSOR 126, AMBIENT LIGHT SENSOR 128, AMBIENT TEMPERATURE SENSOR 132, and THREE-AXIS ACCELERATION SENSOR 134. The audio sensor 125 can be a microphone, for example, which can detect speech or environmental sounds. The positioning sensor can be, for example, a GPS receiver integrated in the device. The positioning sensor can also be, for example, a radio beacon triangulation sensor that determines the location of the wireless device by means of a network of radio beacons, base stations, or access points, as is described for example, in Nokia European patent EP 0 767 594 A2, entitled "Mobile Station Positioning System". These sensors provide inputs which are sampled by the wireless device 100 to infer a current context, as will be described below. The network server 140 in FIG. 1 includes recommendation algorithms 166, context-activity pairs database 192, and context inference engine 142. The wireless device 100 provides recommendations to its user that are appropriate to the device's current environment by selecting an activity, pairing it with the current context result, and sending the context-activity pair to the network server 140. The network server 140 searches its database of recommendations using the context-activity pair, and returns recommendations to the user.

In FIG. 1, the user's portable wireless device 100 includes the microbrowser 102 which displays the Recommendation Web Services menu, to enable the user to navigate through the cards or pages being displayed and to select options that are programmed by the application programs 106. The microbrowser 102 and the user's wireless device displays a recommendation web services menu. The recommendation web services menu provides the user with options to select: (A) REQUEST A RECOMMENDATION; (B) UPDATE PRIVACY FEATURES; and (C) MANAGE CONTEXT-ACTIVITY PROFILE.

The REQUEST A RECOMMENDATION menu displays the following options:

REQUEST A RECOMMENDATION:

[1] SELECT A SERVICE CATEGORY

[2] SEND PAST RECEIVED RECOMMENDATIONS

[3] SEND PAST SERVICES USED

[4] SEND PRESTORED SERVICE PREFERENCES

[5] ENTER SPECIAL SERVICE REQUIREMENTS

[6] CHANGE PRESTORED SERVICE PREFERENCES

[7] CHANGE PRIVACY FILTER SETTINGS

Reference to FIG. 2A will show how these seven menu selections invoke corresponding processes in both the user's device 100 and in the network server 140.

Figure 2B:
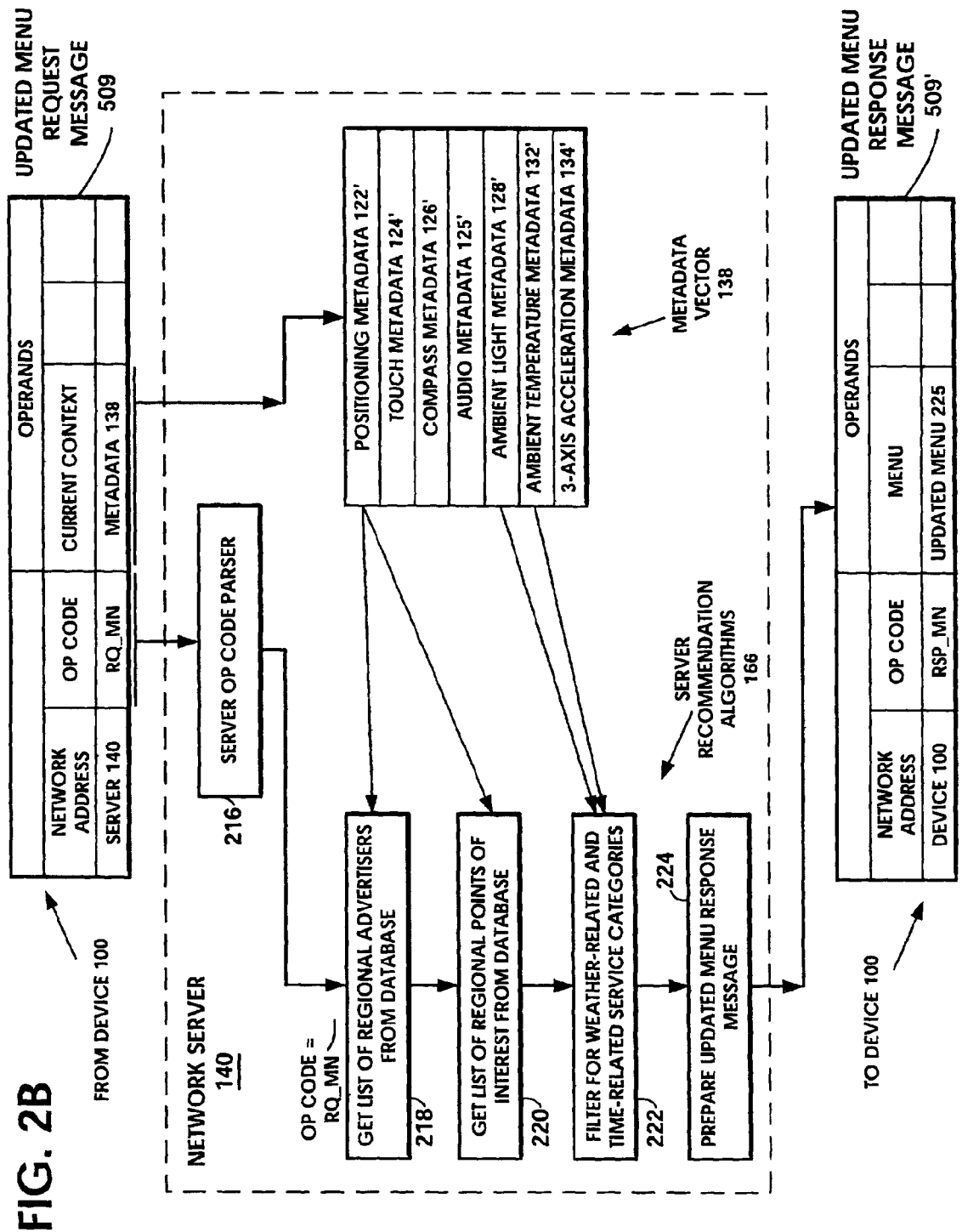
FIG. 2B is a flow diagram of a process in the network server 140 to respond to an updated menu request message from the device 100, by compiling an updated menu which is returned to the device 100.
Figure 2C:
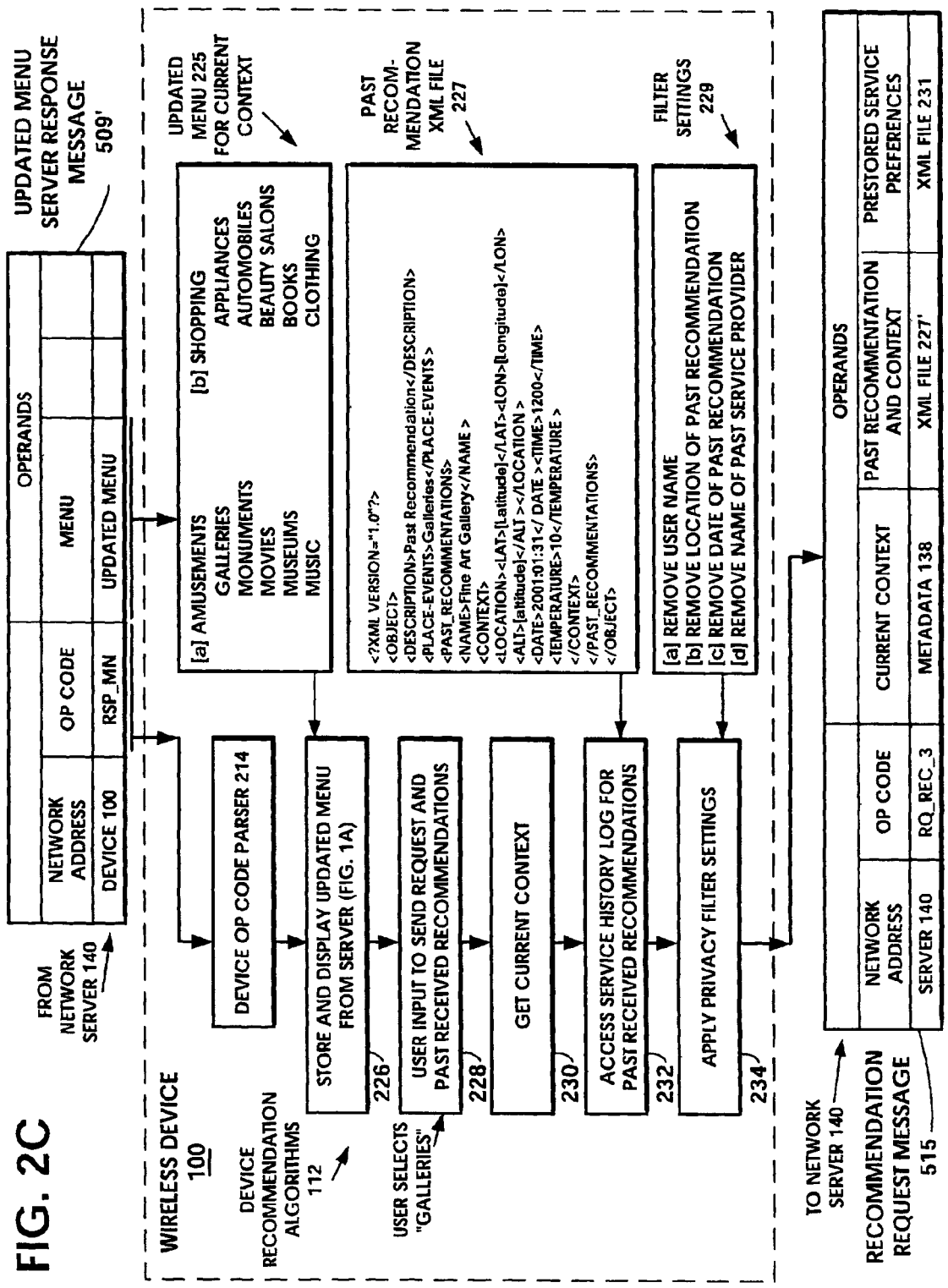
FIG. 2C is a flow diagram of a process in the wireless device 100 to display the updated menu on the device's browser and process the user's request for a recommendation by gathering past received recommendations from the service history log and pairing them with the current context of the device. The context-activity pair is then sent in a recommendation request message to the network server 140.

The option 501 to [1] SELECT A SERVICE CATEGORY invokes process 508 in the user's device 100, to RETRIEVE UPDATED SERVICE CATEGORY MENU, as shown in FIGS. 2B & 2C. Process 508 sends updated menu request message 509 to process 608 in the network server 140, to UPDATE SERVICE CATEGORY MENU, as shown in FIG. 2B. The updated menu 225 is returned in updated menu response message 509', as shown in FIGS. 2B & 2C. The updated menu 225 is displayed in the device's browser 102 in FIG. 1A. This same sequence of steps is automatically performed by the wireless device 100 and the network server 140 in response to the wireless device 100 automatically transmitting messages with a unique op code designating that the message is an automatically transmitted message.

Figure 1E:
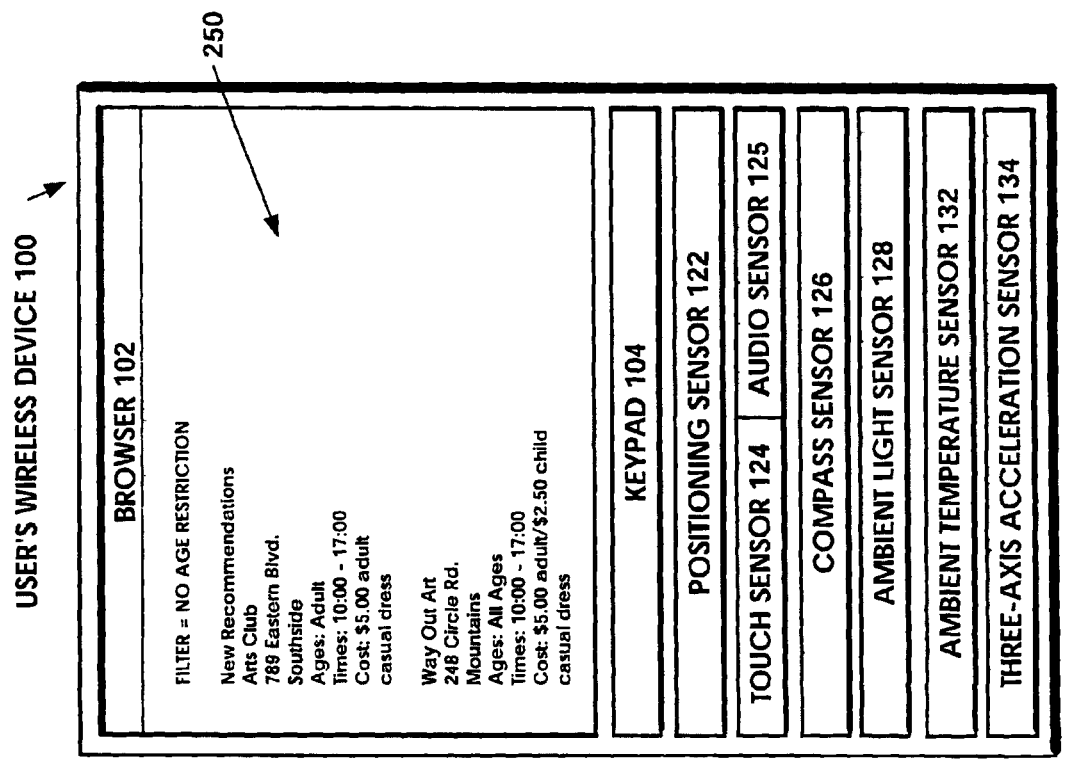
FIGS. 1E and 1F show the user's wireless device displaying the recommendation results, for recommendations with no age restriction filter and for recommendations with a filter for family oriented subject matter, respectively.
Figure 2E:
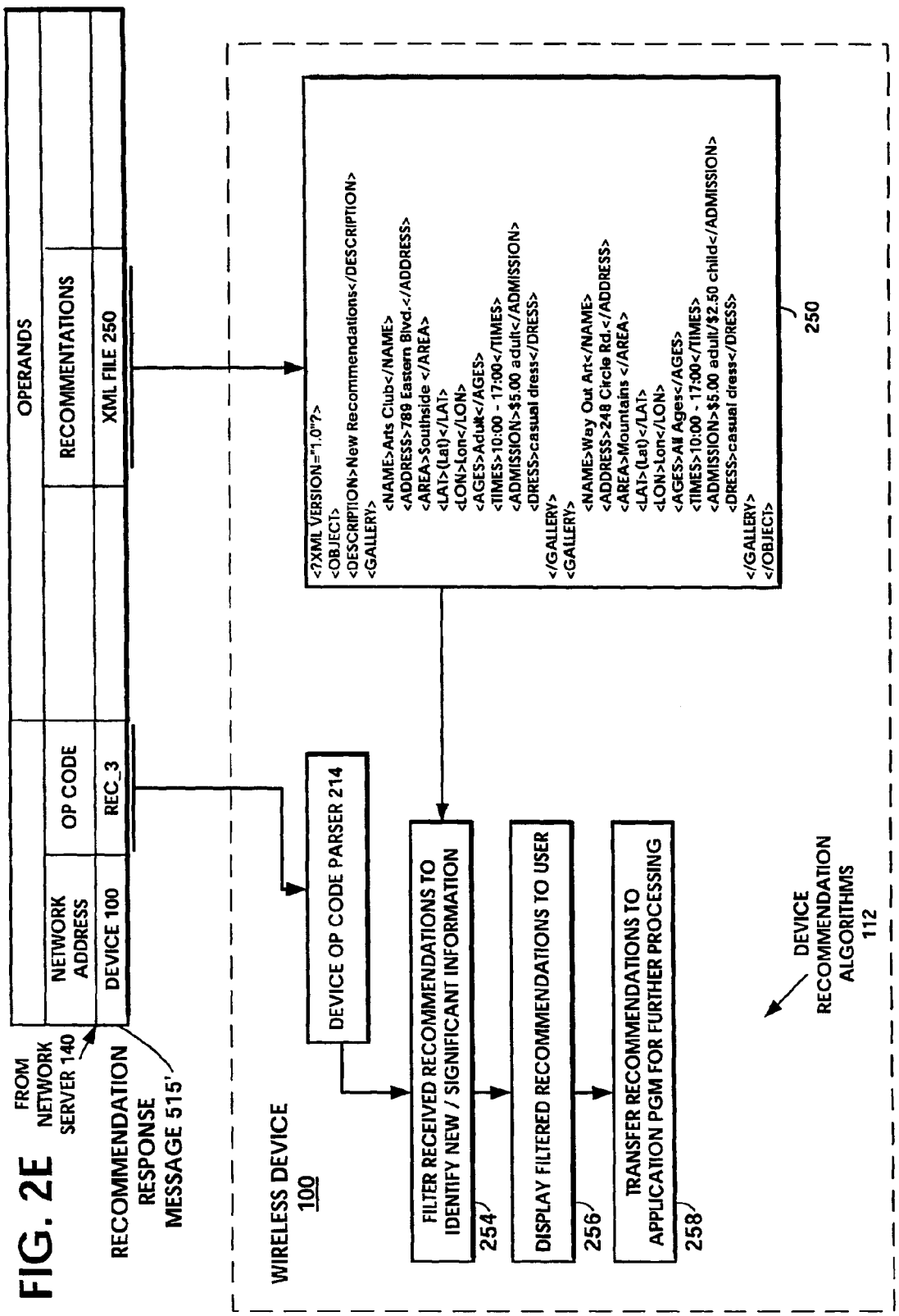
FIG. 2E is a flow diagram of a process in the wireless device 100 to filter the recommendations received in the recommendation response message and display the filtered recommendations on the device's browser.

The option 502 to [2] SEND PAST RECEIVED RECOMMENDATIONS invokes process 514 in the user's device 100, to SEND CONTEXT & PAST RECEIVED RECOMMENDATIONS, as shown in FIGS. 2D & 2E. Process 514 sends recommendation request message 515 to process 614 in the network server 140, to PROVIDE NEW RECOMMENDATIONS CORRESPONDING TO PAST RECOMMENDATIONS, as shown in FIG. 2D. The recommendations 250 are returned in recommendation response message 515', as shown in FIG. 2D. The recommendations 250 are displayed in the device's browser 102 in FIG. 1E. This same sequence of steps is automatically performed by the wireless device 100 and the network server 140 in response to the wireless device 100 automatically transmitting messages with a unique op code designating that the message is an automatically transmitted message.

Figure 2G:
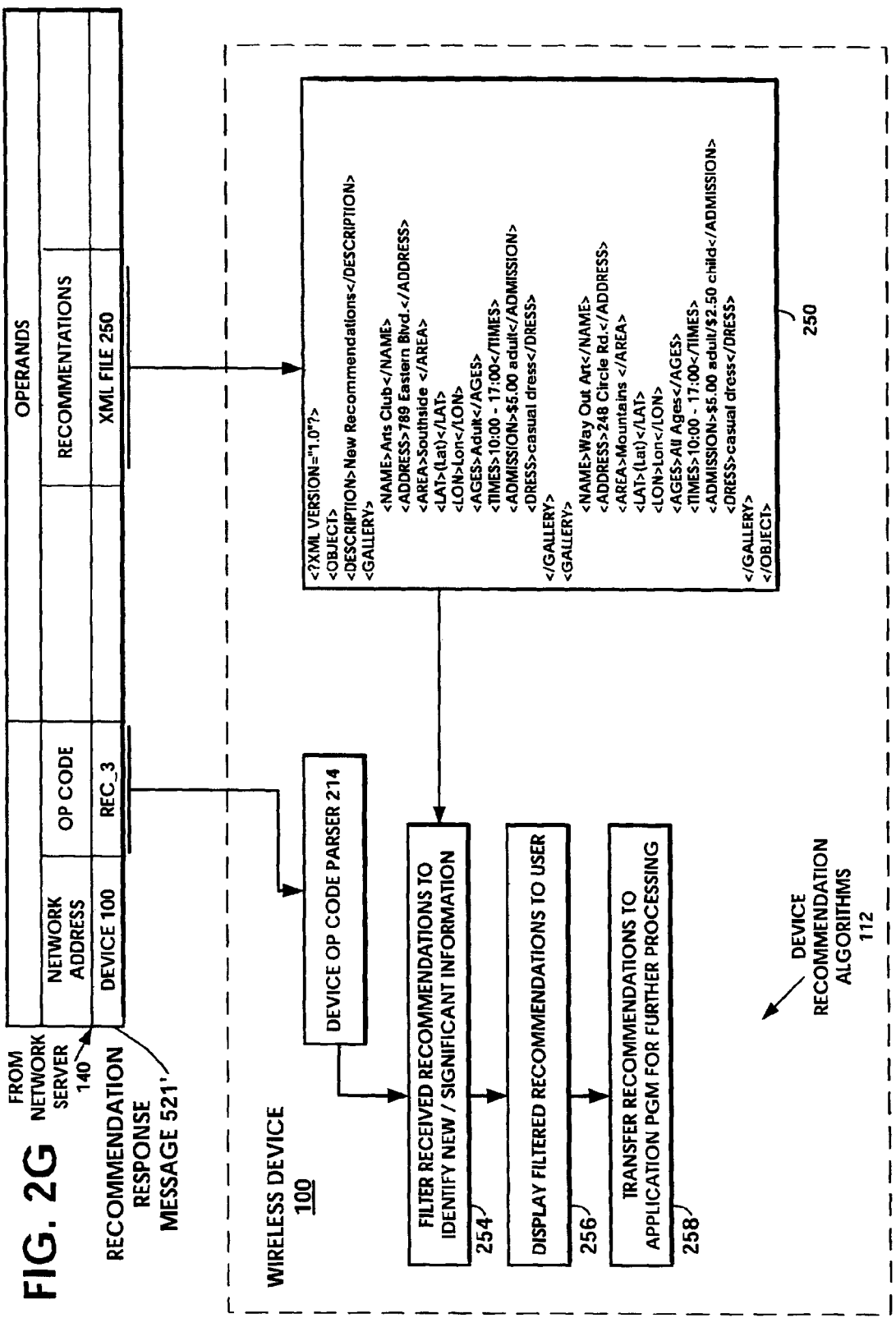
FIG. 2G is a flow diagram of a process in the wireless device 100 to filter the recommendations received in the recommendation response message and display the filtered recommendations on the device's browser.

The option 503 to [3] SEND PAST SERVICES USED invokes process 520 in the user's device 100, to SEND CONTEXT AND PAST SERVICES USED, as shown in FIGS. 2F & 2G. Process 520 sends recommendation request message 521 to process 620 in the network server 140, to PROVIDE NEW RECOMMENDATIONS CORRESPONDING TO PAST SERVICES USED, as shown in FIG. 2F. The recommendations 250 are returned in recommendation response message 521', as shown in FIG. 2G. The recommendations 250 are displayed in the device's browser 102 in FIG. 1E. This same sequence of steps is automatically performed by the wireless device 100 and the network server 140 in response to the wireless device 100 automatically transmitting messages with a unique op code designating that the message is an automatically transmitted message.

The option 504 to [4] SEND PRESTORED SERVICE PREFERENCES invokes process 510 in the user's device 100, to SEND CONTEXT AND PRESTORED SERVICE PREFERENCES in the prestored service preferences file 231, as shown in FIGS. 2D & 2F. An example of prestored service preferences is shown displayed in the browser 102 of FIG. 1C. Process 510 sends message 511 to process 610 in the network server 140, to PROVIDE RECOMMENDATIONS CORRESPONDING TO SERVICE PREFERENCES. The recommendations 250 are returned in message 511'.

The option 505 to [5] ENTER SPECIAL SERVICE REQUIREMENTS invokes process 512 in the user's device 100, to SEND CONTEXT AND SPECIAL SERVICE REQUIREMENTS. An example of special service requirements is shown displayed in the browser 102 of FIG. 11B. Process 512 sends message 513 to process 612 in the network server 140, to PROVIDE RECOMMENDATIONS CORRESPONDING TO SPECIAL REQUIREMENTS. The recommendations 250 are returned in message 513'.

The option 506 to [6] CHANGE PRESTORED SERVICE PREFERENCES invokes process 516 in the user's device 100, to CHANGE PRESTORED SERVICE PREFERENCES. An example of a menu to change prestored service preferences is shown displayed in the browser 102 of FIG. 1C. The option 507 to [7] CHANGE PRIVACY FILTER SETTINGS invokes process 518 in the user's device 100, to CHANGE PRIVACY FILTER SETTINGS. An example of a menu to change privacy filter settings is shown displayed in the browser 102 of FIG. 1D.

As the user carries about the wireless device 100, its sensors 122–134 continuously measure the geographic location and context of the device, which are compiled into a metadata vector 138 representing the current context. The wireless device 100 periodically transmits the current context in an updated menu request message 509, shown in FIG. 2B, over the wireless network 105 to the network server 140. The updated menu request message 509 includes the network address of the server 140, an op code value RQ_MN that designates the message as an updated menu request message, and an operand portion containing the current context. The network server 140 of FIG. 2B includes a server op code parser 216 that interprets the op code value RQ_MN as indicating that the message is an updated menu request message 509. In response, the server op code parser 216 invokes step 218 of the server recommendation algorithms 166. Step 218 gets from a database a list of services provided by regional advertisers corresponding to the current context of the device 100. Step 218 flows to step 220, which gets from a database a list of services provided by regional points of interest, such as galleries, monuments, museums, and the like, corresponding to the current context of the device 100. Step 220 flows to step 222, where the list of services provided by regional advertisers and the list of services provided by regional points of interest are filtered for weather related and time related service categories, eliminating those services that cannot be used by the user in the current context. For example, night baseball is eliminated, if the current context is daytime. Hiking a nature trail is eliminated if the current context is bad weather. Step 222 flows to step 224, where the updated menu message 509' is prepared. The updated menu message 509' includes the network address of the device 100, an op code "RSP_MN" that designates the message as an updated menu server response message, and operands. The operands include the updated menu 225. The updated menu 225 is returned to the device 100 in the updated menu response message 509', as shown in FIGS. 2B & 2C. This same sequence of steps is automatically performed by the wireless device 100 and the network server 140 in response to the wireless device 100 automatically transmitting messages with a unique op code designating that the message is an automatically transmitted message.

The device op code parser 214 in FIG. 2C interprets the op code value "RSP_MN" as indicating that the message is an updated menu server response 509'. In response, the device op code parser 214 invokes step 226 of the device recommendation algorithms 112. Step 226 stores and displays the updated menu 225 in the device's browser 102 in FIG. 1A.

The user can initialize the device 100 by entering special service requirements as shown in the browser 102 of FIG. 1B. Examples of special service requirements that can be stored in the service history log 110 of device 100 are:
 [a] AGE REQUIREMENT:
 ALL AGES/CHILD AGE RANGE/ADULTS ONLY
 [b] TIME OF DAY REQUIREMENT:
 EARLIEST/LATEST
 [c] MAX WALKING DISTANCE
 [d] PRICE RANGE
 [e] PREFERRED DRESS:
 CASUAL/DRESSY/FORMAL
 [f] HANDICAPPED FACILITIES:
 RAMPS/HAND RAILS/REST ROOMS.

The user can initialize the device 100 by entering stored service preferences, as shown in the browser 102 of FIG. 1C. Examples of stored service preferences that can be stored in the service history log 110 of device 100 are:
 GALLERIES [modem art]
 MONUMENTS [maritime history]
 MOVIES [family oriented]
 MUSEUMS [technology; natural history]
 MUSIC [jazz]
 NIGHT LIFE [professional sports]
 OUTDOORS/FITNESS [sailing; cycling]
 RESTAURANTS [casual]
 THEATER [orchestral]

The user can initialize the device 100 by entering privacy filter settings, as shown in the browser 102 of FIG. 1D. Privacy filter settings are used to remove the user's private information from the messages sent by the device 100 to the network server 140. Examples of privacy filter settings that can be stored in the device 100 are:

FOR CURRENT REQUESTS:
[a] REMOVE USER NAME
[b] ENTER OTHER DATA TO REMOVE
FOR PAST RECOMMENDATIONS:
[a] REMOVE USER NAME
[b] REMOVE LOCATION OF PAST RECOMMENDATION
[c] REMOVE DATE OF PAST RECOMMENDATION
[d] REMOVE NAME OF PAST SERVICE PROVIDER
[e] ENTER OTHER DATA TO REMOVE

The service history log 110 in the user's device 100 stores activities in four component databases: [1] past recommendations and context, [2] past services used and context, [3] prestored service preferences, and [4] special requested service requirements. An example is shown in FIG. 2 of the two component databases: [1] past recommendations and context 227 and [2] past services used and context 235. The embodiment of the database shown in FIG. 2 uses extensible markup language (XML) files to provide a coherent view of the wide variety of data that can be used to characterize a contexts, services, and recommendations. To specify the current context, XML tags are used to categorize each type of context data that characterizes the current context. The each unit context data is delineated by a beginning tag and an ending tag, forming an element. For example, the element "<TEMPERATURE>10 degrees Celsius</TEMPERATURE>" defines the category as temperature, and specifies the data as "10 degrees Celsius". As another example, the element "<LAT>38 degrees, 48 minutes North</LAT>" defines the category as geographic latitude, and specifies the data as "38 degrees, 48 minutes North". Another feature of XML is its ability to specify a hierarchy in the categories of data. For example, geographic location is normally specified as both a latitude and a longitude. The categories of data for latitude and longitude can be thought of as "child" categories within the category for geographic location. XML expresses this hierarchy as follows:

<LOCATION>
<LAT>38 degrees, 48 minutes North</LAT>
<LON>76 degrees, 38 minutes West</LON>
</LOCATION >

A typical specification of the context for an activity stored in the service history log 110 would be, for example:

<CONTEXT>
<LOCATION>
  <LAT>38 degrees, 48 minutes North</LAT>
  <LON>76 degrees, 38 minutes West</LON>
  <ALT>150 meters</ALT>
/LOCATION>
<DATE>2001:01:31</DATE>
<TIME>1200</TIME>
<TEMPERATURE>10 degrees Celsius</TEMPERATURE>
</CONTEXT>

By expressing the context in the service history log 110 in XML, the stored expression is both human and machine readable, it defines the content, and it defines the hierarchical structure of the content. XML also separates the appearance of the content from the structure of the content, so that the content can be displayed in any format by using customized style sheets in each different type of display device. Extensible Stylesheet Language (XSL) can provide flexible document presentation, enabling the content of an XML file to be displayed on the large display screen of a personal computer, as well as in the microbrowser 102. Messages exchanged between the wireless device 100 and the network server 140 can include XML files carried in the Simple Object Access Protocol (SOAP) messaging protocol or the SyncML synchronization protocol. For additional background on XML, see the book by Heather Williamson, *XML: The Complete Reference*, Osborne/McGraw-Hill, 2001.

Both the wireless device 100 and the network server 140 interpret the tags of the XML elements in the XML file in the same way. This can be accomplished by incorporating the same XML tag parser in both the device recommendation algorithms 112 of the wireless device 100 and in the server recommendation algorithms 166 of the network server 140. In its simplest form, the XML tag parser can be a simple string comparison function that searches the XML file for XML tag strings, such as the beginning tag "<LOCATION>" and the ending tag "</LOCATION>". When it finds the a particular beginning tag, it gets the data located between the beginning tag and the ending tag and passes the data as "location data" to program subroutines that operate on location data. Such program subroutines include the database search routine in the server recommendation algorithms 166 in the server 140, that forms a query from the latitude and longitude data to search for recommendations for services in the database 192 having similar latitude and longitude values.

Another way for both the wireless device 100 and the network server 140 to interpret the tags of the XML elements in the XML file in the same way, is by means of a standard XML parser. The two principal, standard XML parsers are the Simple API for XML (SAX) event-based parser and the Document Object Model (DOM) tree-based parser. The principal difference between them is in the way the XML data is made available to the client application, such as the device recommendation algorithms 112. SAX is an event driven model, wherein the client application is continuously notified as the XML document features are recognized by the parser. As the SAX parser reads an XML file, it sends to the application program 112 information from the XML file in real time. Each time the parser sees a beginning tag, an ending tag, character data, or a processing instruction, it reports it to the client application. The entire XML file does not have to be read before acting on the data at the beginning of the file. The entire document does not have to reside in memory, which can be an advantage for the wireless device 100.

The Document Object Model (DOM) model parser is object based, on the other hand, wherein the entire XML document is parsed and stored as a hierarchical tree of objects that the client application can then randomly access. A document type definition (DTD) is available to both the wireless device 100 and in the network server 140, either being stored locally or at a server they can reference. A DTD is a set of declarations that specify the allowed order, structure, and meaning of the tags for a particular XML file. The XML file references the DTD that governs its order, structure, and meaning, at a specified location, such as the directory of the local filesystem, and its filename as a handle. Standard XML parsers are part of many operating systems now available. A DOM tree-based parser reads in the DTD and the XML file and converts the XML file into programming constructs accessible to the application logic. A document type declaration element must appear in the XML file to indicate the DTD to which the XML file complies and where to find it. It starts with "<DOCTYPE" and ends with ">". The example given below is
<DOCTYPE OBJECT "xml_directory\object.dtd">.

Each XML file begins with a processing instruction that gives information to an XML processor in both the wireless device 100 and the network server 140. It starts with "<?" and ends with ">". The example given below is <?XML VERSION="1.0"?>.

An example of a complete XML file specifying a past recommendation received by the device 100 and the context in which it was received, is shown in the following TABLE A, which is the XML file 227 taken from the service history log 110 of FIG. 2.

LAT (#PCDATA)>" to indicate that these elements are present and contain only data, but do not contain not other elements.

Great flexibility is provided by the use of XML to define the data to be included in the files of the four component databases of the service history log 110: [1] past recommendations and context, [2] past services used and context, [3] prestored service preferences, and [4] special requested service requirements. These XML files can be readily identified, accessed, and their elements parsed to obtain the relevant data pertaining to each category. The meaning of the data is assured by its location in a known element type. The XML files, themselves, can be included in the messages exchanged between the wireless device 100 and the network

TABLE A

Example of an XML File Specifying a Past Recommendation

```
<?XML VERSION="1.0"?>
<DOCTYPE PAST_RECOMMENDATIONS_OBJECT "xml_directory\object.dtd">.
<PAST_RECOMMENDATIONS_OBJECT>
    <DESCRIPTION>Past Recommendation</DESCRIPTION>
    <PLACE-EVENTS>Museums</PLACE-EVENTS>
    <PAST_RECOMMENDATIONS>
        <NAME>History Museum</NAME>
        <CONTEXT>
            <LOCATION>
                <LAT>38 degrees, 48 minutes North</LAT>
                <LON>76 degrees, 38 minutes West</LON>
                <ALT>150 meters</ALT>
            </LOCATION>
            <DATE>2001:01:31</DATE>
            <TIME>1200</TIME>
            <TEMPERATURE>10</TEMPERATURE>
            <METAVECTOR>FF12AB34CD</METAVECTOR>
        </CONTEXT>
    </PAST_RECOMMENDATIONS>
</PAST_RECOMMENDATIONS_OBJECT>
```

An abbreviated example of a corresponding document type definition (DTD) that specifies the allowed order, structure, and meaning of the tags for a past recommendation XML file, is shown in the following TABLE B. This is part of a file named "object.dtd" stored in the local filesystem directory named "xml_directory" in both the wireless device 100 and the network server 140. It illustrates, for example, that the PAST_RECOMMENDATIONS element must include both the NAME of the service and the CONTEXT element in which it was recommended. The CONTEXT element must include the LOCATION, the DATE, the TIME, the TEMPERATURE, and the METAVECTOR containing the metadata vector 138 characterizing the context of device. The LOCATION element must include latitude LAT, the longitude LON, and the altitude ALT of the device.

server 140. This can be seen in the following discussion of the process 514 in the wireless device 100 of FIG. 2C, to process the user's request for a recommendation by gathering XML files 227 of past received recommendations from the service history log 110 and pairing them with the current context of the device. The context-activity pair is then sent in a recommendation request message 515 to the network server 140.

In FIG. 1, the user selects the option] SEND PAST RECEIVED RECOMMENDATIONS. Then, in FIG. 1A, the user selects the service category of "GALLERIES" from the service category menu 225. Then in FIG. 2C, step 228, receives the user's input and flows to step 228 to get the current context. The process then flows to step 232 to access the service history log 110 for XML files 227 of past

TABLE B

Abbreviated Example of a Document Type Definition (DTD)

```
<!ELEMENT PAST_RECOMMENDATIONS_OBJECT (DESCRIPTION, PLACE-EVENTS,
PAST_RECOMMENDATIONS)>
<!ELEMENT PAST_RECOMMENDATIONS (NAME, CONTEXT)>
<!ELEMENT CONTEXT (LOCATION, DATE, TIME, TEMPERATURE, METAVECTOR)>
<!ELEMENT LOCATION (LAT, LON, ALT)>
```

In a complete DTD for the XML file of TABLE A, the data elements, such as "<LAT>38 degrees, 48 minutes North</LAT>" would be specified in the DTD as "<!ELEMENT received recommendations. The process then flows to step 234 to apply privacy filter settings 229 to the data in the XML files 227. For example, step 234 can remove any occurrence of the user's name, the location of past recommendations, the date of past recommendations, the name of past service providers, and the like. Then, the recommendation request message 515 is assembled. The recommendation request message 515 includes the network address of the server 140, an op code "RQ_REC_3" that designates the message as a recommendation request message, and the operands. The operands include the current context expressed in a separate field as the metadata vector 138, the past recommendation and context XML file 227', and the prestored service preferences XML file 231. The wireless device 100 then sends recommendation request message 515 to the network server 140, as shown in FIG. 2D.

FIG. 2D is a flow diagram of the process in the network server 140 to respond to the recommendation request message 515 from the device 100. The network server 140 of FIG. 2D includes the server op code parser 216 that interprets the op code value "RQ_REC_3" as indicating that the message is a recommendation request message 515. In response, the server op code parser 216 invokes step 240 of the server recommendation algorithms 166. Step 240 receives the metadata vector 138 from the message 515 and accesses recommendations from the database 192 corresponding to the current context. The process then flows to step 242 which searches through the accessed recommendations obtained from the database to find those similar to the past received recommendations 227' input from the message 515. The process then flows to step 244 which sorts the similar recommendations in accordance with the user's preferences 231, also received in the message 515. The user's preferences 231 is shown as the example XML file of TABLE C, as follows:

TABLE C

Example of an XML File Specifying User Preferences

<?XML VERSION="1.0"?>
<PREFERENCES_OBJECT>
   <DESCRIPTION>Preferences</DESCRIPTION>
   <GALLERIES>Modern Art</GALLERIES>
   <MONUMENTS>Maritime</MONUMENTS>
   <MOVIES>Family Oriented</MOVIES>
</PREFERENCES_OBJECT>

The process then flows to step 246 which updates usage statistics and stores them in a database. The process then flows to step 248 which assembles the recommendation response message 515' and transmits it back to the wireless device 100. The recommendation response message 515' includes the network address of the wireless device 100, the op code "REC_3" that designates the message as a recommendation response message, and the operands. The operands include the recommendations XML file 250.

Figure 1F:
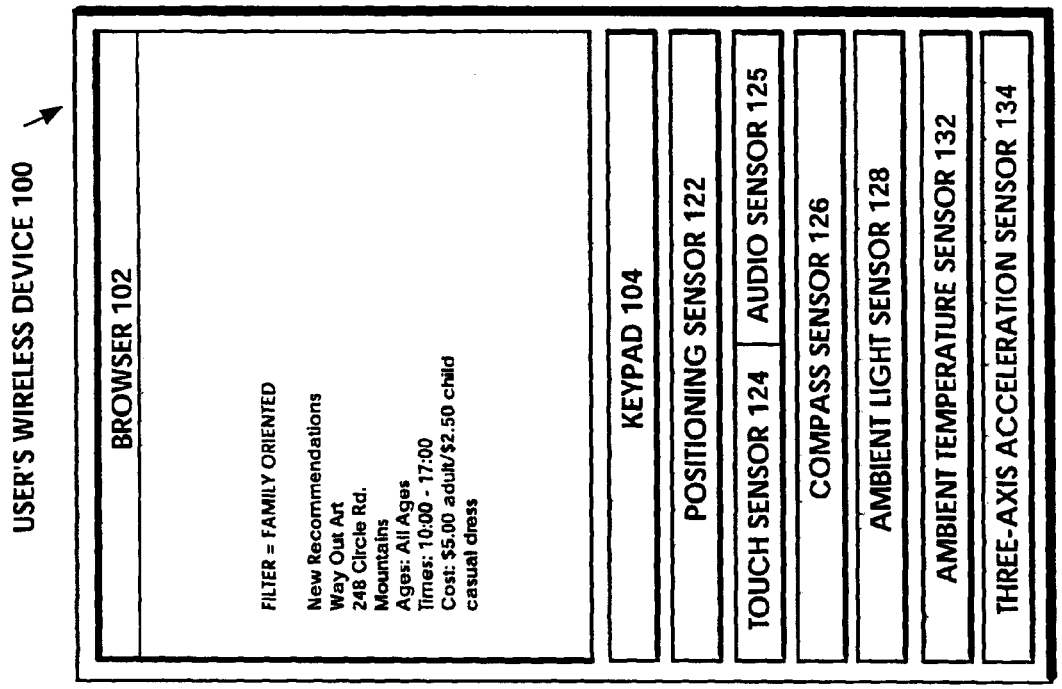

FIG. 2E is a flow diagram of a process in the wireless device 100 to filter the recommendations received in the recommendation response message and display the filtered recommendations on the device's browser. The device op code parser 214 in FIG. 2E interprets the op code value "REC_3" as indicating that the message is a recommendation response message 515'. In response, the device op code parser 214 invokes step 254 of the device recommendation algorithms 112. Step 254 filters the recommendations XML file 250 received in message 515'. The filtering identifies new or significant information in the recommendations XML file 250. This can be accomplished by comparing the recommendations XML file 250 with the past recommendations XML files 227 in the service history log 110. The process then flows to step 256 which displays the filtered recommendations to the user on the browser 102 shown in FIG. 1E. An XSL stylesheet can be used to display the content of the recommendations XML file 250 in the microbrowser 102. FIG. 1E shows the result of a first filtering criterion of "FILTER=NO AGE RESTRICTION". The one of the two recommendations displayed in FIG. 1E has the characterization "Ages: Adult". Alternately, if the filtering criterion were "FILTER=FAMILY ORIENTED" as provided in FIG. 1F, then only one of two potential recommendations is displayed, the displayed recommendation having the characterization "Ages: All Ages". The process then flows to step 258 which optionally transfers the recommendations 250 to the application programs 106 for further processing. This same sequence of steps is automatically performed by the wireless device 100 and the network server 140 in response to the wireless device 100 automatically transmitting messages with a unique op code designating that the message is an automatically transmitted message.

The recommendations XML file 250 providing two recommendations for galleries, is shown as the example XML file of TABLE D, as follows:

TABLE D

Example of an XML File Specifying New Recommendations

<?XML VERSION="1.0"?>
<DOCTYPE RECOMMENDATIONS_OBJECT "xml directory\object.dtd">.
<RECOMMENDATIONS_OBJECT>
   <DESCRIPTION>New Recommendations</DESCRIPTION>
   <RECOMMENDATION>
      <NAME>Arts Club</NAME>
      <LOCATION>
         <ADDRESS>789 Eastern Blvd.</ADDRESS>
           <AREA>Southside </AREA>
         <LAT>(Lat)</LAT>
           <LON>Lon</LON>
      </LOCATION>
      <AGES>Adult</AGES>
         <TIMES>10:00 - 17:00</TIMES>
      <ADMISSION>$5.00 adult</ADMISSION>
         <DRESS>casual dress</DRESS>
   </RECOMMENDATION>
   <RECOMMENDATION>
      <NAME>Way Out Art</NAME>
      <LOCATION>

TABLE D-continued

Example of an XML File Specifying New Recommendations

```
        <ADDRESS>248 Circle Rd.</ADDRESS>
        <AREA>Mountains </AREA>
        <LAT>(Lat)</LAT>
        <LON>Lon</LON>
     </LOCATION>
     <AGES>All Ages</AGES>
     <TIMES>10:00 - 17:00</TIMES>
     <ADMISSION>$5.00 adult/$2.50 child</ADMISSION>
     <DRESS>casual dress</DRESS>
  </RECOMMENDATION>
</RECOMMENDATIONS_OBJECT>
```

An abbreviated example of a corresponding document type definition (DTD) that specifies the allowed order, structure, and meaning of the tags for a new recommendation XML file 250, is shown in the following TABLE E. This DTD is part of a file named "object.dtd" stored in the local filesystem directory named "xml_directory" in both the wireless device 100 and the network server 140. It illustrates, for example, that new RECOMMENDATIONS sent to the wireless device 100 must include LOCATION of the service, but it does not include the complete CONTEXT. The LOCATION must include ADDRESS, AREA, LAT, LON. The DTD can provide for optional data in the XML file, as well, by including other elements, such as "<ADMISSION>" and designating them with an asterisk "*" so that they are not necessarily required in each XML file. The same XML tag parser in both the device recommendation algorithms 112 of the wireless device 100 and in the server recommendation algorithms 166 of the network server 140, can search the XML file for optional XML tag strings, such as the beginning tag "<ADMISSION>" and the ending tag "</ADMISSION>", and if they are found, the XML tag parser gets the data located between the tags and passes it as "admission data" to program subroutines that operate on admission data.

XML recommendations file 250 of TABLE D, that conforms to the DTD of TABLE E. The recommendation algorithm 166 and the DOM tree-based parser, in effect, work together as a document generator. The Document Object Model (DOM) defines the characteristics of the XML file hierarchical tree data structure and an application programming interface (API) for manipulating it. A description of DOM is provided on the web site http://www.w3.org/TR/DOM-Level-2-Core/. For additional information on the Document Object Model and the XML file hierarchical tree data structure, see the book by Elliotte Harold, et al, entitled *XML In A Nutshell*, O'Reilly & Associates, 2001.

In an alternate embodiment, the wireless device uses the SAX event-driven parser and the network server 140 uses the DOM tree-based parser. This arrangement confers the advantage of requiring a smaller memory allocation for the SAX parser in the wireless device 100 and yet it provides the capability of the DOM parser to construct the XML recommendations files 250 in the network server 140.

In another alternate embodiment, Extensible Hypertext Markup Language (XHTML) can be used to display in the wireless device 100 the recommendations 250 in step 256 which are received from the network server 140. XHTML is a hybrid between HTML and XML specifically designed for

TABLE E

Abbreviated Example of a DTD for New Recommendations

```
<!ELEMENT RECOMMENDATIONS_OBJECT (DESCRIPTION, RECOMMENDATION)>
<!ELEMENT RECOMMENDATION (NAME, LOCATION, ADMISSION*)>
<!ELEMENT LOCATION (ADDRESS, AREA, LAT, LON)>
<!ELEMENT ADMISSION (#PCDATA)>
```

To enable the wireless device 100 to read the XML recommendations file 250 of TABLE D, a DOM tree-based parser in the device 100 reads in the DTD of TABLE E and the XML file 250 received from the network server 140. The DOM tree-based parser converts the XML file 250 into a hierarchical tree data structure enabling the data for each element to be accessible to the application programs 106 and recommendation algorithms 112.

This process also works in reverse in the network server 140 and enables the network server to construct the XML recommendations file 250. The DOM tree-based parser can read in the DTD of TABLE E and create the hierarchical tree data structure that serves as a template for the recommendation algorithm 166 in server 140. The recommendation algorithm 166 can then fill the nodes of the tree with recommendation data, such as ADDRESS data, AREA data, LAT data, and LON data. The DOM tree-based parser uses this newly created tree of data to create a corresponding network device displays. A subset of XHTML is XHTML Basic, which defines a document type that is rich enough to be used for content authoring and precise document layout, yet can be shared with wireless mobile devices 100 with small screens, such as PDAs and cell phones. XHTML Basic is the mobile adaptation of XHTML, and includes everything in XHTML except those capabilities, such as frames, that are not appropriate for devices with small screens. XHTML Basic is an XML-based standard, which allows the automatic parsing and transcoding of content through the use of Extensible Stylesheet Language Transformations (XSLT), part of the XSL style sheet language for XML. XSLT provides a language for transforming XML documents into other XML documents. Using XSLT, a system can automatically transform the same XML content into multiple markup languages depending on the browser 102. Through such transformations, content can be created for one type device and automatically transformed to appear on another type device. For example, the network server 140 can create its recommendations once in XML and use XSLT to dynamically convert it to XHTML Basic and HTML for presentation on mobile wireless devices 100.

XHTML Basic can used with cascading style sheets (CSS) to describe how documents are presented on screen in the browser 102. Through the use of CSS, document authors can control the presentation of documents without sacrificing device independence. The use of well-known standard HTML tags avoids storing multiple versions of content. The network server 140 does not need to provide for extra overhead for transcoding required to prepare content for an array of different markup languages. CSS enables a document author to specify the presentation of an application once for each type of device, by means of a corresponding style sheet. If the presentation needs to be changed at any time, the change is made once in the style sheet and the modification is dynamically reflected throughout all the pages in the network server 140. CSS separates the content of the document from the presentation. This allows creating browser-specific versions of the same content simply by creating a corresponding style sheet for each browser type. Then, when a user requests a page at the wireless device 100, the network server 140 server identifies the requesting device and returns the content with a link to the appropriate style sheet. The style sheet is downloaded once and cached by the browser 102 for use with subsequent pages, which speeds the rendering of all pages received from the network server 140. CSS enables every aspect of the appearance of the document, such as positioning, fonts, text attributes, borders, margin alignment, and flow, to be defined in the style sheet. A change to any aspect of the document's appearance needs to be made only once. CSS also gives carriers greater control over the look and feel of the services they provide through their wireless portal. The operator can use XHTML Basic to define a default style sheet for all devices it supports, which will ensure a basic look and feel consistent for all devices 100.

FIG. 2F is a flow diagram of the process in the network server 140 to respond to the recommendation request message 521 from the device 100. FIG. 2F differs from FIG. 2D in by showing how to find database recommendations that are similar to the past services used by the wireless device 100, instead of being similar to the past recommendations received by the device. The network server 140 of FIG. 2F includes the server op code parser 216 that interprets the op code value "RQ_REC_4" as indicating that the message is a recommendation request message 521. In response, the server op code parser 216 invokes step 240 of the server recommendation algorithms 166. Step 240 receives the metadata vector 138 from the message 521 and accesses recommendations from the database 192 corresponding to the current context. The process then flows to step 243 which searches through the accessed recommendations obtained from the database to find those similar to the past services used XML file 235' input from the message 521. The process then flows to step 244 which sorts the similar recommendations in accordance with the user's preferences 231, also received in the message 521. The process then flows to step 246 which updates usage statistics and stores them in a database. The process then flows to step 248 which assembles the recommendation response message 521' and transmits it back to the wireless device 100. The recommendation response message 521' includes the network address of the wireless device 100, the op code "REC_3" that designates the message as a recommendation response message, and the operands. The operands include the recommendations XML file 250. FIG. 2G is similar to the flow diagram of FIG. 2E, of the process in the wireless device 100 to filter the recommendations received in the recommendation response message and display the filtered recommendations on the device's browser. The process displays the filtered recommendations to the user on the browser 102 shown in FIG. 1E. This same sequence of steps is automatically performed by the wireless device 100 and the network server 140 in response to the wireless device 100 automatically transmitting messages with a unique op code designating that the message is an automatically transmitted message.

Another example of the invention is when the user requests a location-based recommendation with the device 100. As discussed above, FIG. 2 shows the service history log 110 has accumulated data on past services used by the user of the device 100 and the contexts of those past services. The recommendation algorithms 112 automatically filters the service history log 110 and selects past services used by the user of the device 100 and the contexts of those past services, treating them as context-activity pairs. It is not necessary that these pairs of selected past services used and past contexts be related to the current context of the device 100. Two examples of these past pairs of selected past services used and past contexts are numbered [10] and [11] as follows:

[10] "location=xyz1; service=www.newsservice.com/ . . . /news.wml", and

[11] "location=xyz2; service=www.stockquotes.com/ . . . /quotes.wml".

The device 100 then sends these two automatically selected past pairs to the network server 140. The recommendation algorithms 112 filter out any reference to the user's ID before sending the pairs to the server. Then, device 100 then sends the current context "location=xyz3" to the network server 140. The current context "xyz3" can represent the airport, for example. When the network server 140 receives the two example past pairs of selected past services used and past contexts, it stores them in its database 192. Past pairs such as these can be accumulated from many users as recommendation resource in the database 192 for use by many other users. Examples of nine other past pairs previously accumulated in database 192 from other users are:

[1] "location=xyz3; service=www.airlines1.com/ . . . /timetables.wml",

[2] "location=xyz3; service=www.airlines2.com/ . . . /timetables.wml",

[3] "location=xyz3; service=www.airlines3.com/ . . . /timetables.wml",

[4] "location=xyz3; service=www.weatheronline.com/ . . . /weather.wml",

[5] "location=xyz4; service=www.horoscope1.com/ . . . /stars.wml",

[6] "location=xyz4; service=www.horoscope2.com/ . . . /stars.wml",

[7] "location=xyz5; service=www.emailservice1.com/ . . . /mail.wml",

[8] "location=xyz5; service=www.emailservice2.com/ . . . /mail.wml", and

[9] "location=xyz5; service=www.emailservice3.com/ . . . /mail.wml",

The network server 140 compares the current context "location=xyz3" the past contexts of past pairs previously accumulated in database 192. There are four matches:

[1] "location=xyz3; service=www.airlines1.com/ . . . /timetables.wml",

[2] "location=xyz3; service=www.airlines2.com/ . . . /timetables.wml",

[3] "location=xyz3; service=www.airlines.3com/ . . . /timetables.wml", and

[4] "location=xyz3; service=www.weatheronline.com/ . . . /weather.wml".

The network server 140 sends a list of the four past services used (by others) taken from the list of the four matches, as four recommendations to the user's device 100. The four recommendations are:

[1] service=www.airlines1.com/ . . . /timetables.wml",

[2] service=www.airlines2.com/ . . . /timetables.wml",

[3] service=www.airlines.3com/ . . . /timetables.wml", and

[4] service=www.weatheronline.com/ . . . /weather.wml".

The recommendation algorithms 112 in the user's device can filter these four recommendations received from the server, if desired. The filtered recommendations are then displayed to the user and one or more of these displayed recommendations can be selected. The user's selected recommendations and the current context "location=xyz3" are then stored in the service history log 110. For example, if the user selects:

[2] service=www.airlines2.com/ . . . /timetables.wml", then this recommendation and the current context "location=xyz3" are stored in the service history log 110.

Figure 3:
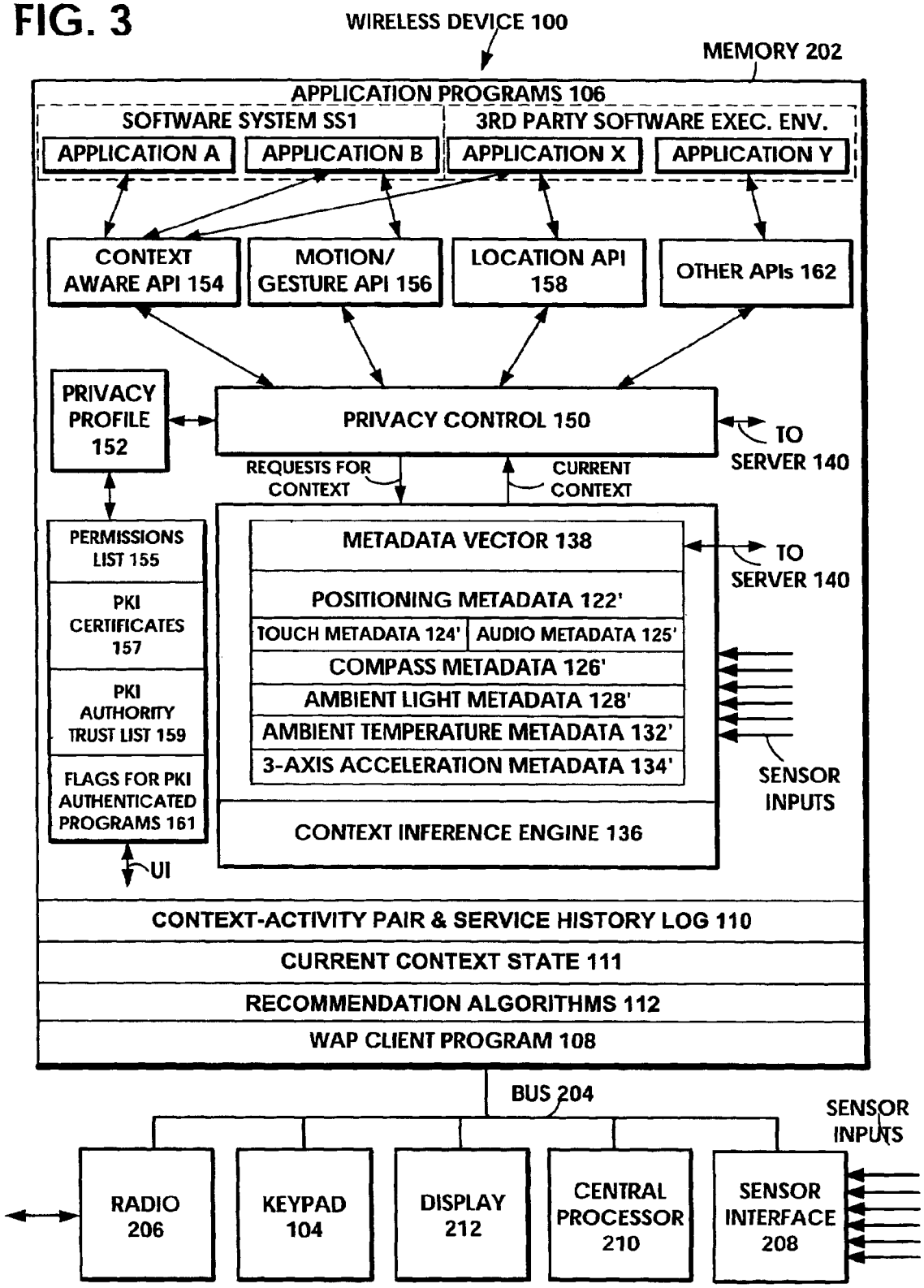
FIG. 3 is a functional block diagram of the wireless device 100, showing its various components and programs.

Turning now to FIG. 3, a functional block diagram is shown of the wireless device 100, with its various components and programs. The memory 202 of the wireless device 100 is connected by means of the bus 204 to the keypad 104, the radio 206, the sensor interface 208, the central processor 210, and the display 212 which displays the browser 102. The memory 202 stores the context-activity pair and service history log 110, which is shown in greater detail in a first example in FIG. 2 and in a second example in FIG. 6B. The memory 202 also stores the current context state 111 which includes a description of the environment of the wireless device 100 at the present time. As will be discussed further below, the characterization of the environment of the wireless device 100, includes the metadata vector 138 which includes information relating to the sensor signals input from the sensors at the current time. Also included in the memory 202 are recommendation algorithms 112 which will be discussed further below.

FIG. 3A is a functional block diagram of the wireless device 100, the server 140 and the webserver 160 and their interaction when exchanging a metadata vector 138 and privacy control data 150' and when exchanging a context-activity pair 190 and associated recommendations 200. FIG. 3A will be discussed in greater detail below in conjunction with the network process flow diagram of FIG. 3B which shows the interaction of the wireless device 100 with the network server 140 and the web server 160 when carrying out the determination of the current context of the wireless device 100.

Figure 3B:
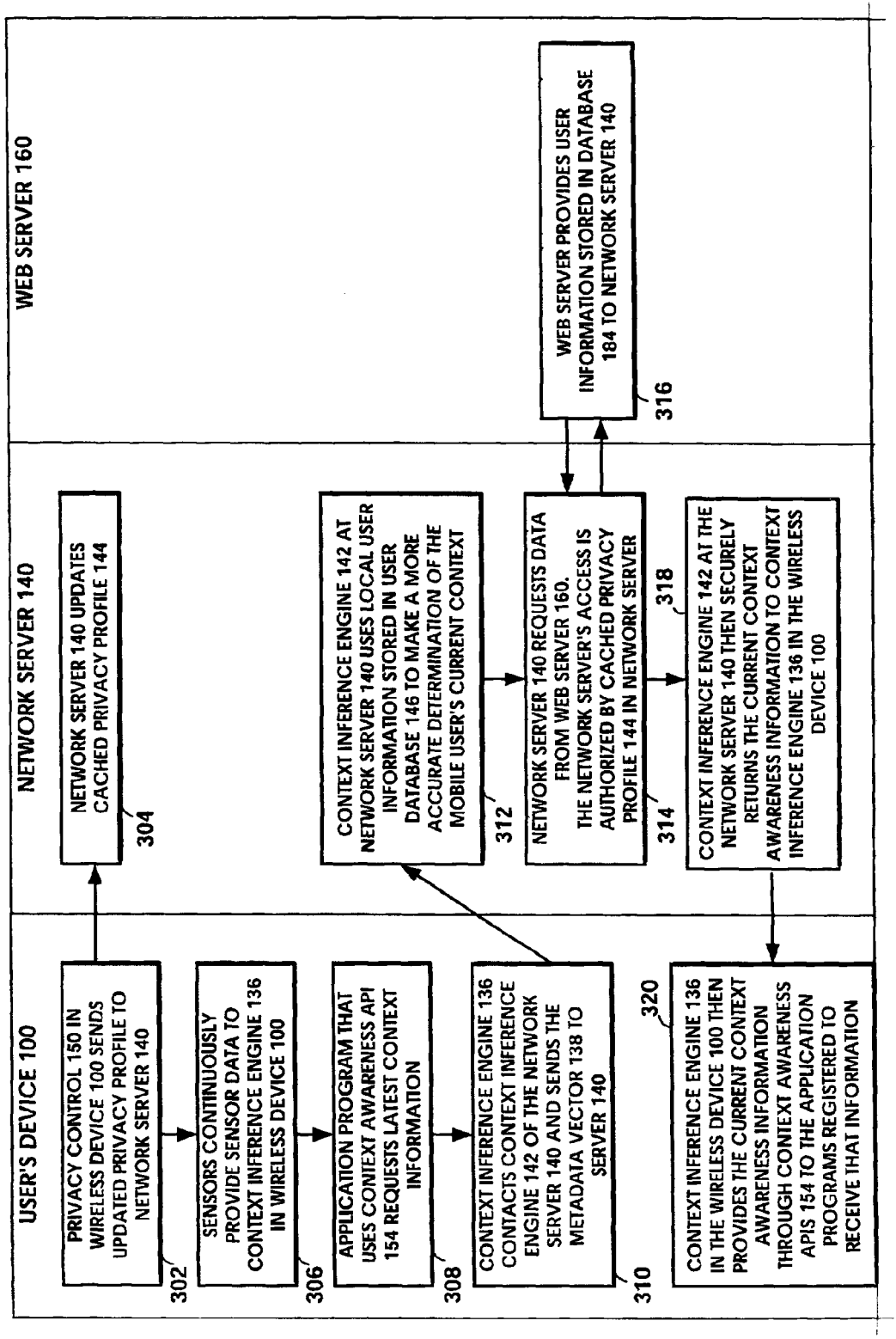
FIG. 3B is a network process flow diagram of the interaction of the wireless device 100, network server 140, and web server 160 when carrying out the determination of the current context of the wireless device 100.
Figure 3C:
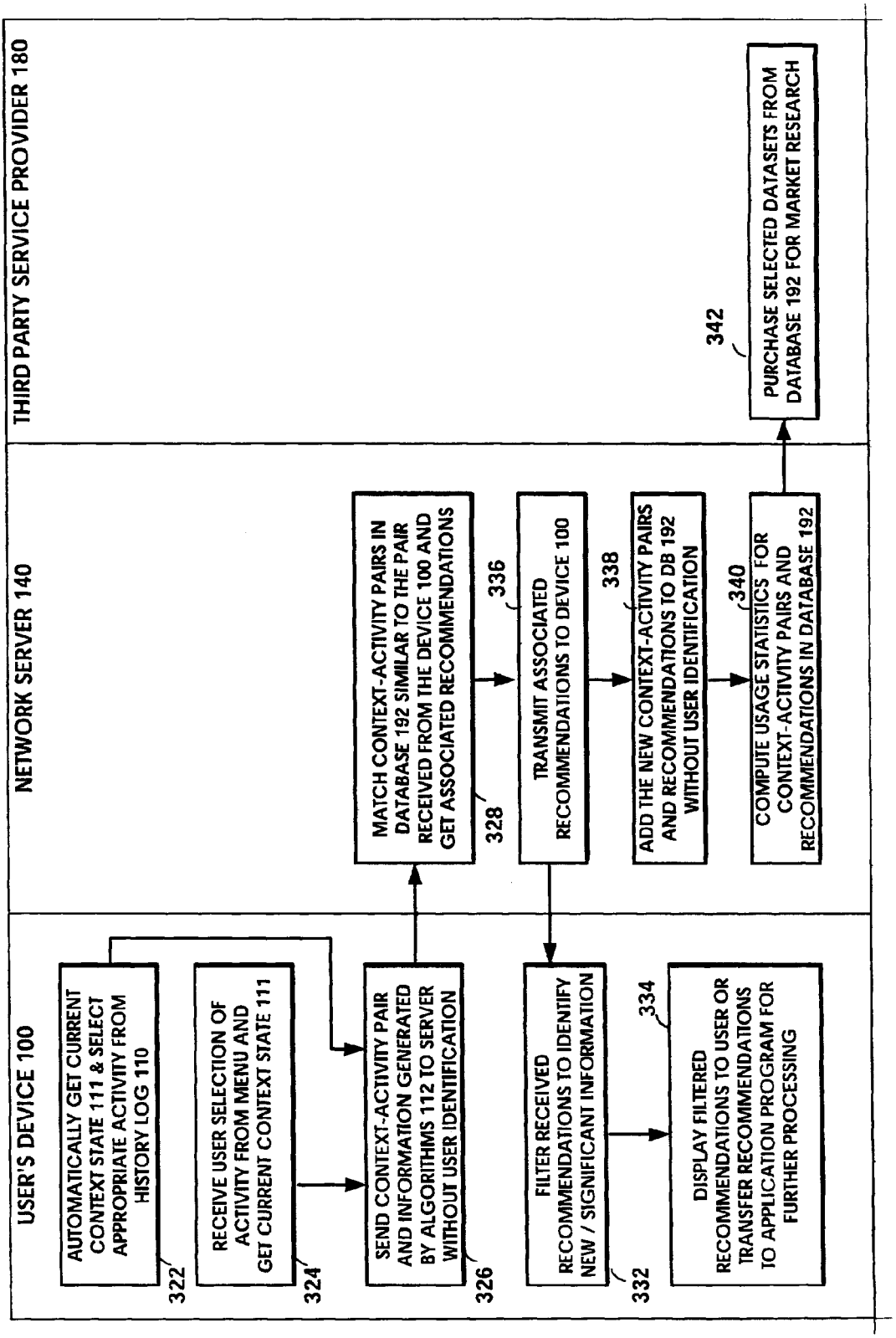
FIG. 3C is a network process flow diagram of the interaction of the wireless device 100 and network server 140 when the user's wireless device with a requested context-activity pair which is sent to the network server and the resultant service recommendations received back from the server.

Turning now to FIG. 3C, a network process flow diagram is shown of the interaction of the wireless device 100 and the network server 140 when the user's wireless device sends a current context-activity pair to the network server 140 and the resultant service recommendations received back from the server 140. There are two ways that the user's device 100 can initiate sending the current context-activity pair to the server 140. The first way is shown in step 322 of FIG. 3C, where the user's device 100 is programmed to automatically get the current context state 111 from the context inference engine 136, and to select an appropriate activity from the history log 110, and to send the current context-activity pair to the server 140. The activities can be past recommendations made by the network server 140, past services used, prestored service preferences, special requested service requirements, or any combination of these. The second way that the device 100 can send a context-activity pair is shown in step 324, where the user inputs a selection of an activity onto the request a recommendation sub menu shown in FIG. 5E or 5F. In response, the device 100 then gets the current context state 111 from the context inference engine 136. The device 100 then sends the current context-activity pair to the server 140.

Step 326 of FIG. 3C shows that the context-activity pair can be processed by the recommendation algorithms 112 in the wireless device 100, before transmission to the server 140. An important feature of the invention is that the information transmitted to the network server 140 can be without any user identification, in order to preserve the privacy of the user's information. Often instead of single context-activity pair 190 a sample filtered by recommendation algorithm 112 of representative context-activity pairs and related service history items from log 110 is transmitted to recommendation algorithm 166. That is, message 190 is often a set of context-activity pairs and related service history items.

Figure 3E:
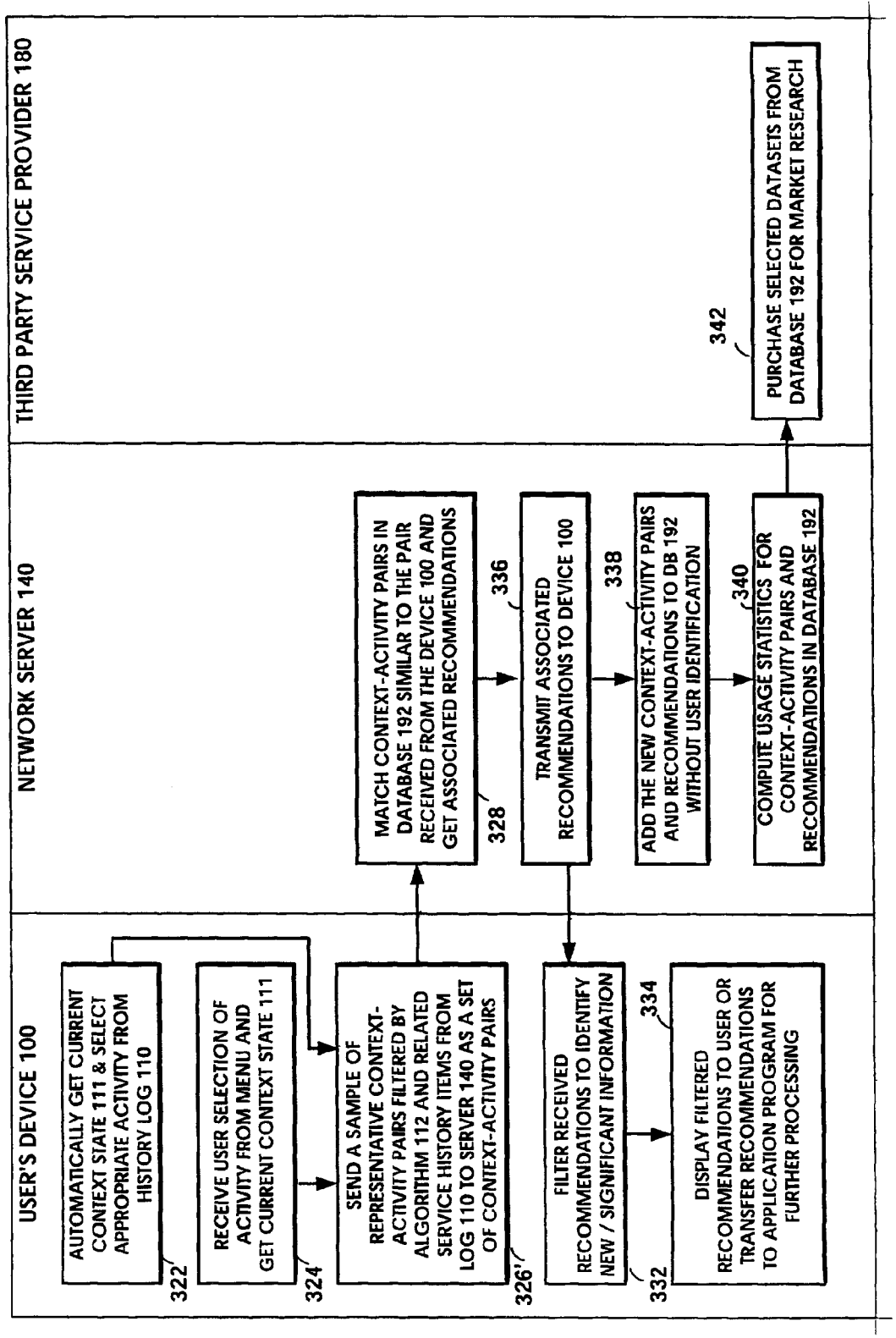
FIG. 3E is a network process flow diagram of an alternate embodiment of the invention, in which Step 326' sends to recommendation algorithm 166 in server 140, a sample of representative context-activity pairs filtered by algorithm 112 and related service history items from log 110 as a set of context-activity pairs and related service history items.

In an alternate embodiment of the invention shown in FIG. 3E, Step 326' sends to recommendation algorithm 166 in server 140, a sample of representative context-activity pairs filtered by algorithm 112 and related service history items from log 110 as a set of context-activity pairs and related service history items.

In step 328 of FIG. 3C, the network server 140 receives the context-activity pair 190 from the device 100, and processes the context-activity pair with the recommendation algorithms 166. The recommendation algorithms 166 match the context-activity pairs stored in the database 192 which are similar to the context-activity pair which was received from the device 100, and it accesses the associated recommendations for the matched context-activity pairs from the database 192. This can be seen to better advantage in FIG. 6A which shows an example of the context-activity pairs and associated services database 192 in the server 140.

Figures 5A, 5B:
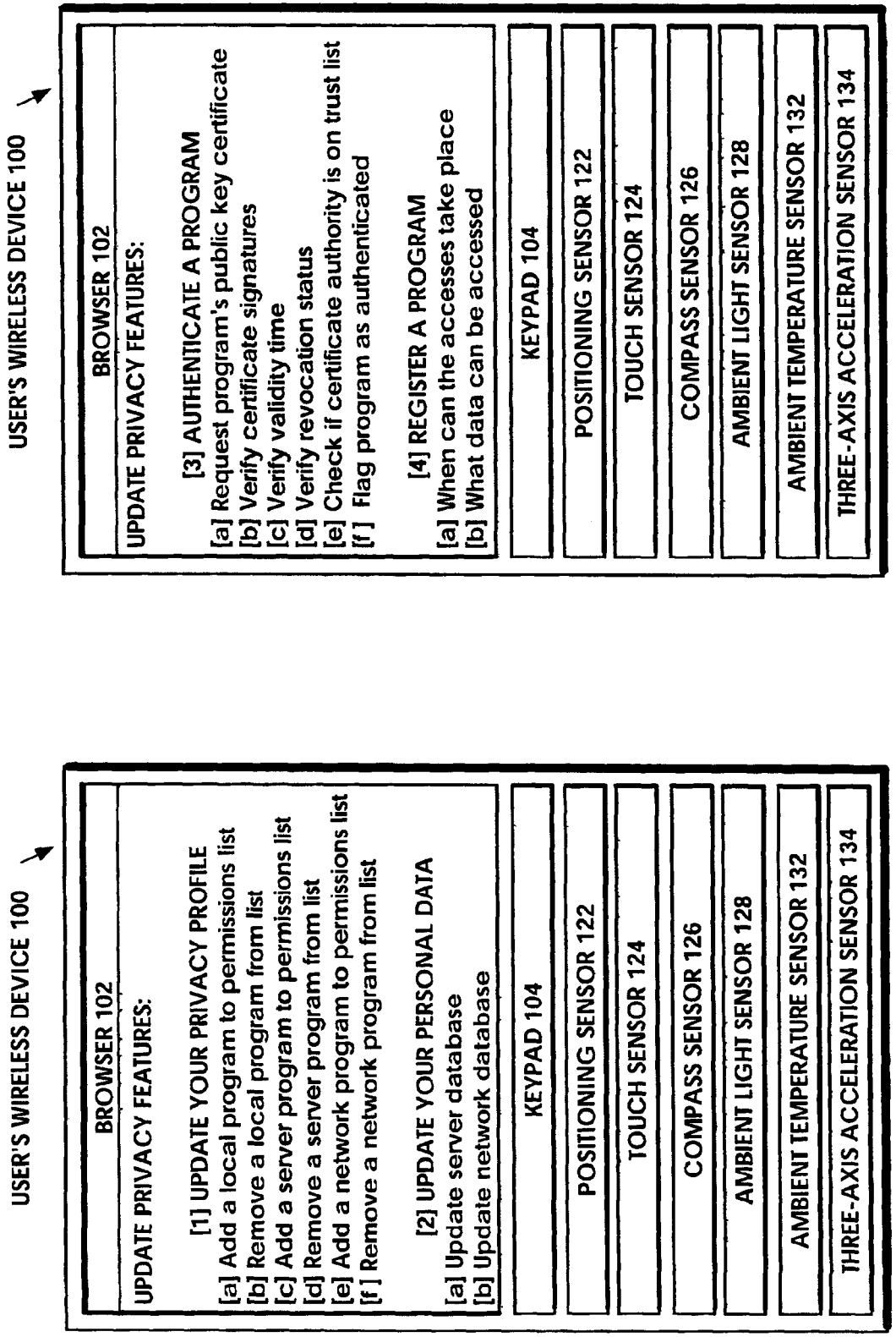
FIGS. 5A and 5B show an alternate embodiment of the user's wireless device with the UPDATE PRIVACY FEATURES: sub-menu of the Recommendation Web Services menu.
Figure 5D:
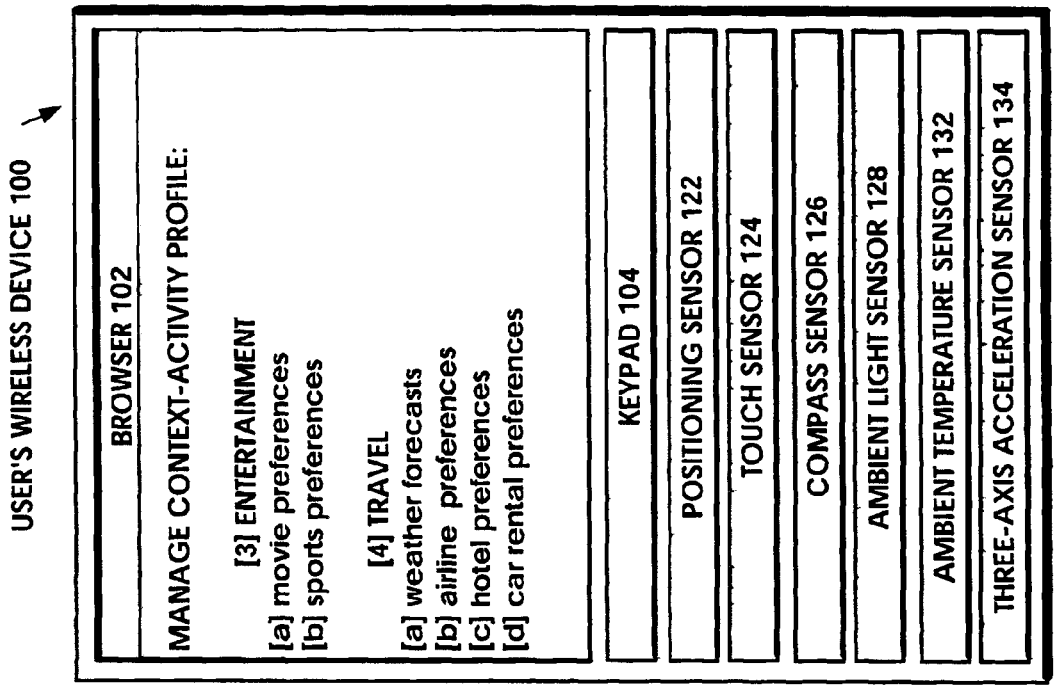
FIGS. 5C and 5D show an alternate embodiment of the user's wireless device with the MANAGE CONTEXT-ACTIVITY PROFILE sub-menu of the Recommendation Web Services menu.
Figure 5C:
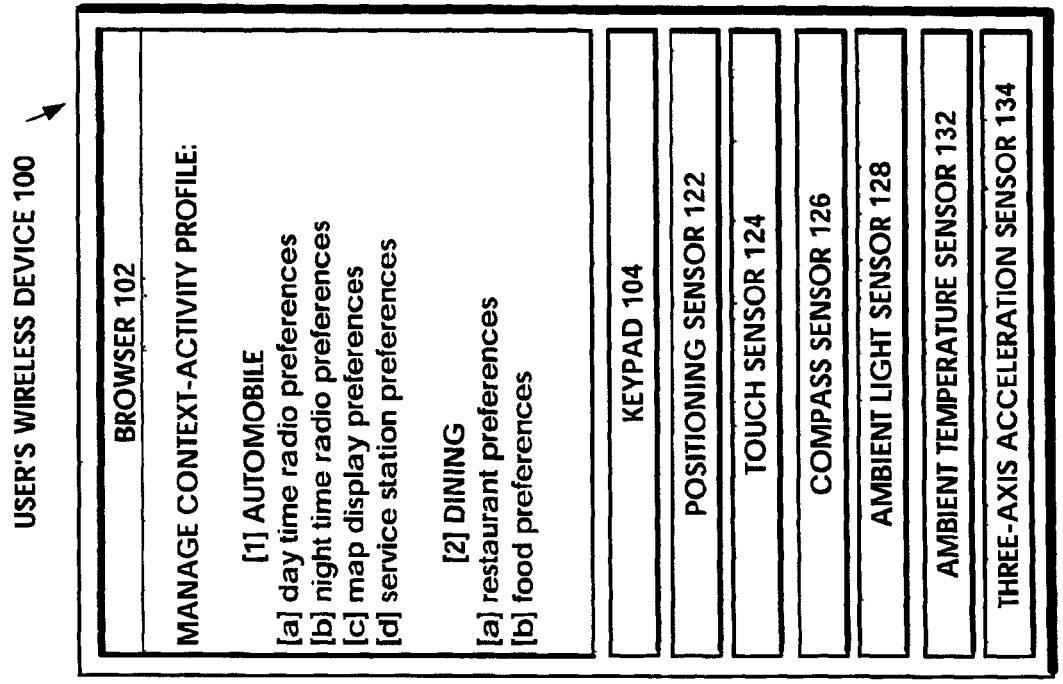
Figures 5E, 5F:
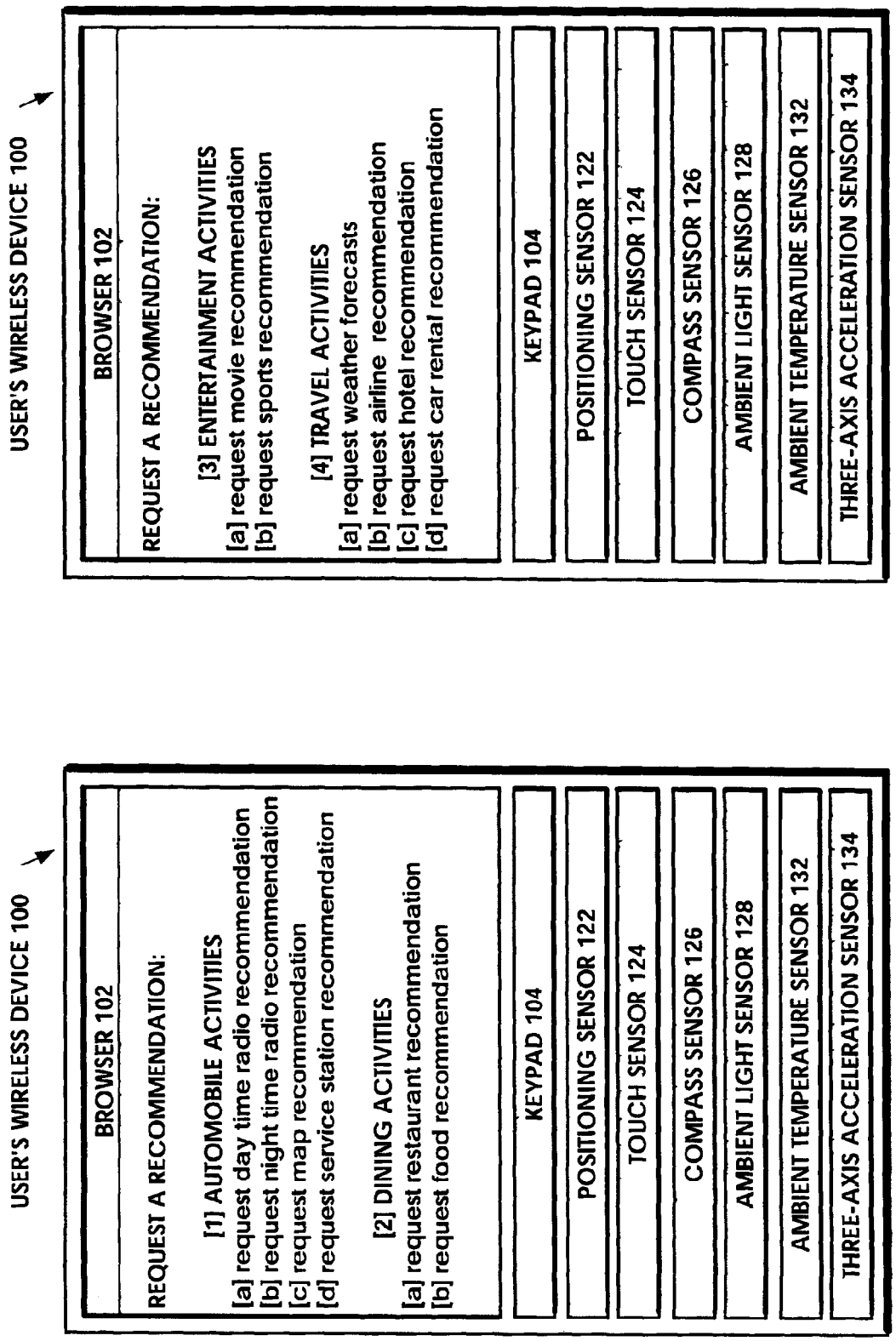
FIGS. 5E and 5F show an alternate embodiment of the user's wireless device with the REQUEST A RECOMMENDATION sub-menu of the Recommendation Web Services menu.
Figure 5H:
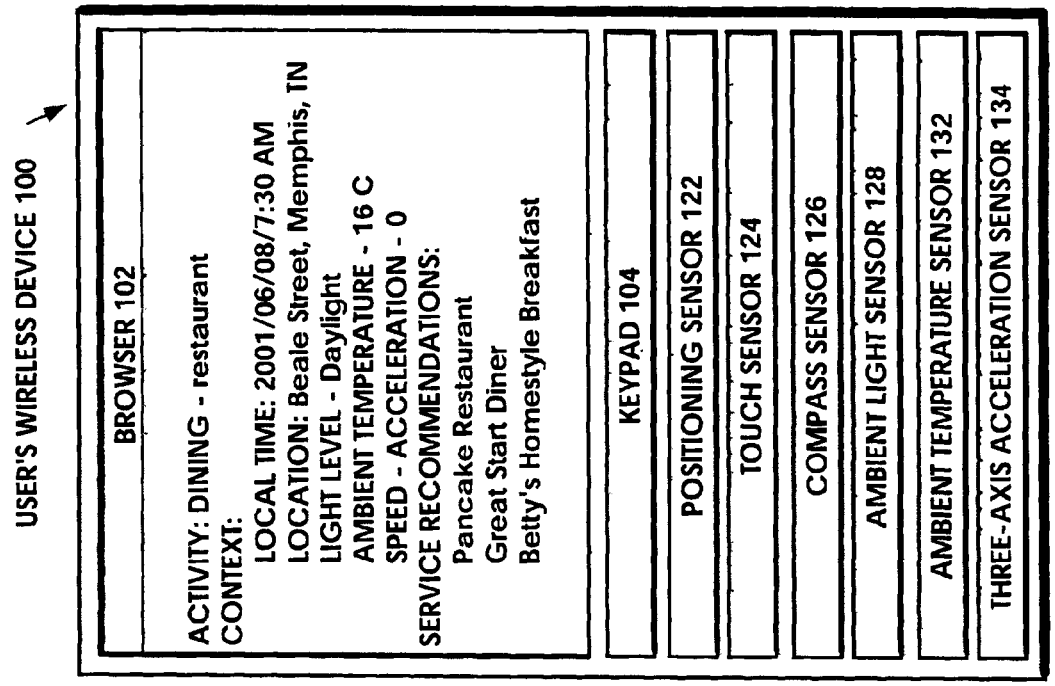
FIGS. 5G and 5H show two examples of the alternate embodiment of user's wireless device with a requested context-activity pair which is sent to the network server and the resultant service recommendations received back from the server.
Figure 5G:
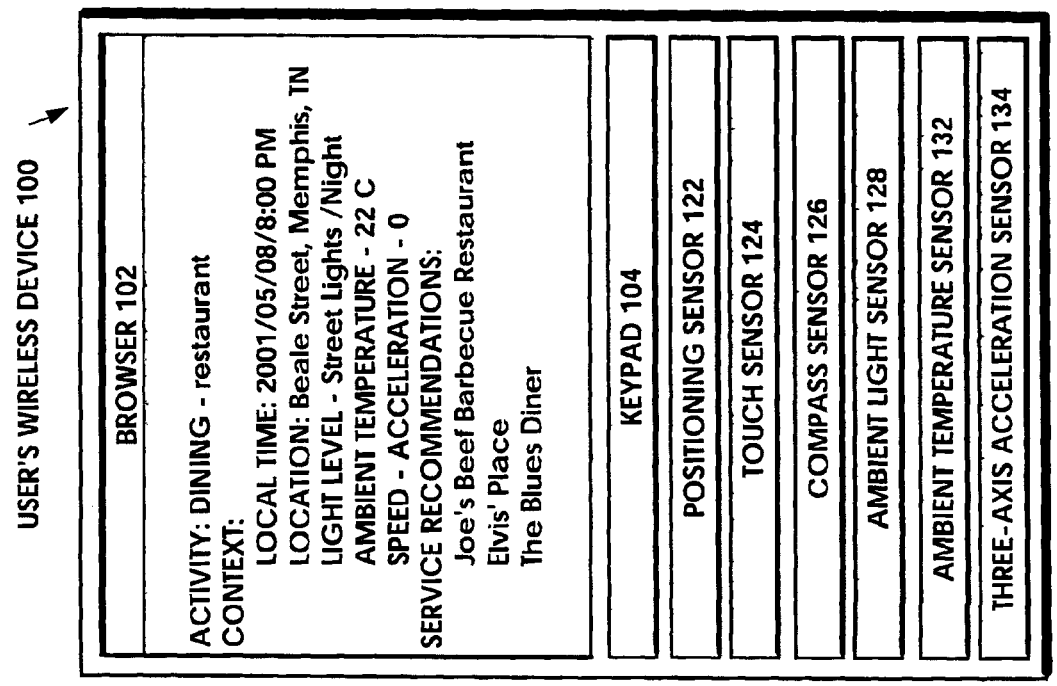

Referring for a moment to FIG. 5G, the user has selected at the wireless device 100, the activity of "dining-restaurant". The current context is a particular local time and location, a particular light level, ambient temperature, speed and acceleration. This current context information, values sent from the recommendation algorithms 111 in the device 100, past recommendations 227 or past services used 235, and optionally the corresponding metadata vector 138, are sent as the context-activity pair information 190 to the network server 140.

Referring now to FIG. 6A showing an example of the contents of the database 192, the first row in the context-activity pairs column gives a range of times, a range of locations, a range of temperatures and a range of speed and accelerations for context-activity pairs which are to be matched with the current context-activity pair being transmitted from the wireless device 100. The corresponding associated service recommendations are shown in the middle column. For each respective service recommendation in the middle column, there is a corresponding number of times that that particular recommendation has been made to other users in the past, as shown in the right-hand column of FIG. 6A. The current context is 8:00 PM at night and therefore the service recommendations seen to be different from the service recommendations that would be made from the second row of the database 192 in FIG. 6A. In the second row it can be seen that the context-activity pairs deal with a morning timeframe at the same location. There, it can be seen that in the middle column for the second row, the recommendations are not the same as they were for the nighttime recommendations for the first row. Similar to the previous description, the right-hand column of FIG. 6A gives the number of times that each respective service recommendation has been made to prior users. The recommendation algorithms 166 in the network server 140 perform the matching operation and identify the first row in FIG. 6A as a match for context-activity pairs. Accordingly, the recommendation algorithms 166 in the network server 140 return the recommendations 200 to the user's wireless device 100. Those recommendations are the service recommendations shown in the upper row middle column of FIG. 6A. The number of times each recommendation has been made can also be transmitted in the recommendations 200. This is performed in the step 336 of the process diagram of FIG. 3C. The "number of times recommended" is only one of the measures which can be used to generate new recommendations. Other measures include parameters based on feedback.

Step 332 of FIG. 3C receives the recommendations 200 at the wireless device 100, and the recommendation algorithms 112 apply a filtering operation to the received recommendations to identify any new or significant information. New information can be determined by reference to the context-activity pairs and service history log 110 in device 100, which is shown in greater detail in FIG. 2 and in FIG. 6B. There it can be seen that in the past, this particular wireless device 100 has received old recommendations for two entries which are also part of the set of recommendations 200 now being received from the server 140. The recommendation algorithm 112 removes the two old recommendations shown in the top row middle column of FIG. 6B so that only the new recommendations received in the recommendations 200 from the network server 140 are to be displayed to the user in the wireless device 100. The recommendations algorithms 112 can make other determinations, for example it can examine the user's rating of the respective old recommendations as shown in FIG. 6B and can take the user's rating into consideration in the display of current recommendations to the user. The recommendation algorithms 112 in the wireless device 100 can also take into consideration the number of times that each respective recommendation has been previously recommended to other users, that information having been transmitted in recommendations 200 to the wireless device 100. Then in step 334 of FIG. 3C, the wireless device displays the filtered recommendations to the user. Alternately, the wireless device can transfer the filtered recommendations to an application program for further processing. In some embodiments the wireless device 100 provides feedback to the server 140 after step 334. The feedback is used to enhance the quality of later matching operations in step 328.

At the network server 140, as shown in FIG. 3C, step 336 transitions to step 338 in which the new context-activity pairs and recommendations are added to the database 192. An important feature of this invention is that there is no user identification which is included in the database 192. Then step 340 of FIG. 3C computes usage statistics for the context-activity pairs in the database 192 and associates the usage statistics with the respective recommendations stored in the database 192. This information can have economic value to third party service providers such as the service provider 180. As is seen in FIG. 3C, step 342 shows the third party service provider 180 purchasing selected data sets from the database 192 to be used for market research.

An alternate embodiment of the invention is shown in FIG. 3D. In the alternate embodiment, the context-activity pair information 190 sent by the wireless device 100 in FIG. 3A to the network server 140, includes the metadata vector 138. Where the processing power or memory capacity of the wireless device 100 may be limited, the network server 140 can make a more accurate determination of the mobile user's current context by assisting in the further processing of the metadata vector 138. The metadata vector 138, which is discussed in greater detail below, represents the current sensor signals and characterizes the current state of the wireless device 100. A context inference engine 142 in the network server 140 of FIG. 3A is embodied as programmed instructions executed within the server 140. The resultant current context computed by the server 140 and the activity information received from the wireless device 100 in the context-activity pair 190, constitute the current context-activity pair. The context-activity pair database 192 maintained by the server 140 associates a current context-activity pair with appropriate recommendations made in the past to many users. As the system makes new recommendations to users in response to context-activity pairs submitted by their wireless devices, the server 140 gathers the new recommendations and adds them to its context-activity pair database 192. No user personal data is included in the context-activity pair database 192. In this manner, the variety, quality and pertinence of the recommendations in the database 192 grows as the recommendation system is used. As an added benefit, the server 140 compiles statistical usage information about the recommendations and stores this in the context-activity pair database 192.

The network process flow diagram of the alternate embodiment of FIG. 3D begins with either step 321 or step 323 in the user's wireless device 100. In step 321, the user's device 100 is programmed to automatically get the current metadata vector 138 from the context inference engine 136, and to select an appropriate activity from the history log 110. In alternate step 323, the user can make an activity selection from the request a recommendation sub menu shown in FIG. 5E or 5F. Both steps 321 and 323 flow into step 325 in the user's wireless device 100. In step 325, the context inference engine 136 contacts the context inference engine 142 of the network server 140 shown in FIG. 3A, and sends the metadata vector 138 and activity as the context-activity pair 190 to server 140. The process then flows to step 327 in the network server 140. The context inference engine 142 at network server 140 uses user information stored in the server in the user database 146 to make a more accurate determination of the wireless device's current context. Step 327 then flows to step 328, and the rest of the steps in the flow diagram of FIG. 3D are substantially the same as those described above for FIG. 3C. In this manner, the network server 140 can then assist the wireless device 100 in determining the wireless device's current context, as well as the server 140 sending the resultant service recommendations back to the wireless device 100.

Context Sensitive Web Services

The context sensitive web services feature enables a mobile phone or wireless PDA to use context inference techniques to sense the user's environment and in response, to provide recommendations to the user that is appropriate to the user's perceived environment. The feature offloads some of the computationally intensive computing necessary in context inference techniques, from the mobile user's wireless device to a server and to web sites on the Internet. The context sensitive web services feature maintains a personal profile of the mobile user's personal preferences in an online server or web site. The mobile user is provided with the ability to control access by application programs in the wireless device, to the user's private data. The context sensitive web services feature provide the mobile user with the ability to control any access to the user's profile by the online server or web site.

The mobile user's wireless device is equipped with a context inference engine for providing and awareness of the mobile user's context to application programs, including third party applications. Since the processing power and storage capacity is limited in typical wireless devices, the computational load and storage requirements of the context inference engine are distributed to a context inference server capable of processing the context data. The feature enables the mobile user to control which application programs in the wireless device are granted access to the user's private context information. A privacy control block in the wireless device grants or revokes access by application programs to the private context information, based on the mobile user's preferences stored in a privacy profile. The same privacy control and privacy profile is extended to the context inference server, thereby enabling the extension of the user's privacy control to any web server connected to the context inference server. The feature thus enables building an infrastructure for context sensitive applications and services within the wireless device and the server, while providing to the mobile user control over the privacy user's context information.

The Recommendation Web Services menu displayed by the microbrowser 102 in FIG. 1 is rendered by the WAP client program under the control of the application programs 106, which are shown in FIGS. 3 and 3A. If the UPDATE PRIVACY FEATURES session type is selected by the user, the Recommendation Web Services menu of FIG. 1 then presents to the user the UPDATE PRIVACY FEATURES sub-menu from which the user can select the following options:

[A] UPDATE PRIVACY FEATURES:
[1] UPDATE YOUR PRIVACY PROFILE
[2] UPDATE YOUR PERSONAL DATA
[3] AUTHENTICATE A PROGRAM

Option [1] of UPDATE YOUR PRIVACY PROFILE, leads to a second sub-menu shown in FIG. 5A, which has the following options:

[1] UPDATE YOUR PRIVACY PROFILE
[a] Add a local program to permissions list
[b] Remove a local program from list
[c] Add a server program to permissions list
[d] Remove a server program from list
[e] Add a network program to permissions list
[f] Remove a network program from list.

Option [2] of UPDATE YOUR PERSONAL DATA, leads to a another sub-menu shown in FIG. 5A, which has the following options:

[2] UPDATE YOUR PERSONAL DATA
[a] Update server database
[b] Update network database.

Option [3] of AUTHENTICATE A PROGRAM, leads to a another sub-menu shown in FIG. 5A, which has the following options:

[3] AUTHENTICATE A PROGRAM
[a] Request program's public key certificate
[b] Verify certificate signatures
[c] Verify validity time
[d] Verify revocation status
[e] Check if certificate authority on trust list
[f] Flag program as authenticated.

The AUTHENTICATE A PROGRAM option calls the privacy control 150 of the wireless device 100 in FIG. 3. If an application program A, B, X, or Y has been verified for its acceptability by a trusted authority, then the trusted authority will have issued a digital certificate on a message authentication code (MAC) it has computed for the application program, which can be checked by the privacy control 150. As long as the privacy control 150 trusts the trusted authority issuing the digital certificate, authentication of the application program is straight forward.

Once the mobile user has verified the program's digital certificate and is satisfied that the application program will not subvert the integrity or security of the user's private data, the user can register the program. Registration is the granting by the user of access permission to the program, to access the current context of the user's wireless device and/or to access other portions of the user's private data. There are several levels of permission that can be granted by the user in two categories, [a] when can the accesses take place and [b] what data can be accessed.

Option [4] of REGISTER A PROGRAM, leads to a another sub-menu shown in FIG. 5A, which has the following options:

[4] REGISTER A PROGRAM
[a] When can the accesses take place
[b] What data can be accessed For the first category of [a] when can the accesses take place, the highest level of permission in this category is that access can occur anytime and without notice. The lowest level of permission in this category is that access can only occur at specified times or under specified conditions, and only after notice to the user and specific authorization by the user. For the second category of [b] what data can be accessed, the highest level of permission in this category is to access unlimited datasets in the user's private data, including current context information, personal data entered by the user, the user's Internet usage history data, the user's Internet cookie data, and the user's application program usage data. The lowest level of permission in this category is that access of any data can only occur after notice to the user and specific authorization by the user. The user can configure any levels of permission in between the highest and lowest and make that the basis for the registration. The user can include the terms of registration in a digital certificate signed by the user and appended to the application program. This registration certificate can be presented by the program to the privacy control 150 prior to a proposed access event, the privacy control 150 to automatically verify the registration status of the program. The registration certificate can be constructed as follows.

The privacy control 150 can compute a message authentication code (MAC) and its own digital signature and append it as a certificate to an acceptable application program A, B, X, or Y. The privacy control 150 can include the terms of registration in the digital certificate. Then when the program requests access to the user's private data, the privacy control 150 can automatically check the MAC and its own digital signature to verify that the program has not been changed and the privacy control 150 can also automatically verify the registration status of the program. This is achieved by the privacy control 150 computing a hash value for the entire application program A, B, X, or Y (or some portion of it) and the terms of registration, and then forming a message authentication code (MAC) from the hash value. The privacy control 150 then uses its PKI private key to digitally sign the message authentication code (MAC). The terms of the registration, the MAC and the privacy control's digital signature are appended to the application program A, B, X, or Y as a registration certificate.

Then, whenever the application program A, B, X, or Y requests access to the user's context data or private data, the privacy control 150 will require the application program to present the registration certificate so that the privacy control 150 can check that the presented MAC compares with a computed MAC and that the presented digital signature is genuine. The privacy control 150 can then automatically grant access permission to the application program, in accordance with the terms of the registration.

Methods to generate and evaluate message authentication codes to insure the integrity of data are described in the book by Stephen Thomas entitled *SSL and TLS*, published by John Wiley and Sons, 2000. Two example algorithms for message authentication are RSA's Message Digest (MD5) and the Secure Hash Algorithm (SHA), both of which are described in the book by Stephen Thomas. Another reference that goes into greater detail in its discussion of data integrity methods is the book by Bruce Schneier entitled *Applied Cryptography—2nd Edition* published by John Wiley and Sons, 1996. Methods to generate and evaluate digital signatures to insure the source of the digital program are described in the book by Richard E. Smith entitled *Internet Cryptography*, published by Addison Wesley, 1997.

What has been described here for the privacy control 150 in the wireless device 100, is equally applicable to the privacy control 164 in the network server 140 of FIG. 3A. The privacy control 164 in the network server 140 can compute the message authentication code (MAC) and its own digital signature and append it, with the terms of the registration, as a registration certificate to an acceptable application program in the web server 160. Privacy control 164 has a cached copy 144 of the Privacy Profile 152 of the wireless device 100. This enables automatically processing the privacy check in the network Server 140 for access requests from web server 160. When the application program in the web server 160 requests access to the user's private data in the network server 140 or in the wireless device 100, the privacy control 164 in the network server 140 will require the application program in the web server 160 to present the registration certificate so that it can check the MAC and its own digital signature to verify that the application program has not been changed. The privacy control 164 can then automatically grant access permission to the application program in the web server 160, in accordance with the terms of the registration.

FIG. 3 is a functional block diagram of the wireless device 100, showing its various components and programs. The wireless device 100 has context sensitive applications A, B, X, and Y, either downloaded, or in firmware. The wireless device 100 does not need to utilize external functionality in the network for the initial sampling and digitization of the sensor inputs. The sampled and digitized values of the sensor inputs are POSITIONING METADATA 122', TOUCH METADATA 124' AUDIO METADATA 125', COMPASS METADATA 126', AMBIENT LIGHT METADATA 128', AMBIENT TEMPERATURE METADATA 132', and THREE-AXIS ACCELERATION METADATA 134'. The sampled and digitized values of the sensor inputs are loaded into a metadata vector 138.

FIG. 3 shows the memory 202 of the wireless device 100, connected by the bus 204 to the keypad 104, the radio 206, the sensor interface 208, the central processor 210, and the display 212. The memory 202 stores programs which are sequences of executable instructions which, when executed by the processor 210, carry out the methods of the feature. The memory 202 stores the WAP client program, the context inference engine 136, the privacy control 150, the privacy profile 152, the context aware API 154, the motion/gesture API 156, the location API 158, and other APIs 162. The context inference engine 136 processes the metadata vector 138 to produce the current context. Application programs 106 stored in the memory 202 include the application programs A and B which are part of the software system SS1, and the application programs X and Y which are contained in the execution environment "Exec. Env."

If sufficient computational power and storage capacity are available in the wireless device 100, further processing of the metadata vector 138 can take place in the context inference engine 136, toward the objective of producing the result of an inferred current context. However, if at some point in the computation, the context inference engine 136 needs the processing power or storage capacity available at the network server 140, the metadata vector 138 is sent from the wireless device 100 to the context inference engine 142 in the network server 140 of FIG. 3A. The context inference engine 142 in the network server 140 an inferred current context can perform the required processing on the metadata vector 138 and then return it to the context inference engine 136 in the wireless device 100 for completion of the an inferred current context result. Alternately, the context inference engine 142 in the network server 140 can complete the required processing and then return the resultant inferred current context to the wireless device 100.

FIG. 3 shows the architecture of a wireless device with support for context awareness. The context awareness is built on top of sensory information received from various types of sensors physically located in the handset shown in FIG. 1. The sensors shown include POSITIONING SENSOR 122, TOUCH SENSOR 124, AUDIO SENSOR 125, COMPASS SENSOR 126, AMBIENT LIGHT SENSOR 128, AMBIENT TEMPERATURE SENSOR 132, and THREE-AXIS ACCELERATION SENSOR 134. The sensors can also be located in accessory-like phone covers or in a wireless accessory such as a Bluetooth enabled device. The sensors may also be located in the environment such as in the user's rooms or vehicles. Also, the time duration of use of a phone and other available information can be used along with sensor data in context awareness services.

FIG. 3 shows sensor data received from the sensors 122, 124, 125, 126, 128, 132, and 134 is processed by Context Inference Engine 136 which then feeds the data through various APIs 154, 156, 158, and 162 to application programs A, B, X, and Y. The application programs may register themselves at the Application Programming Interface 154 to receive current context or changes in the context. This enables context sensitivity in the application programs.

FIG. 3 shows "native" application programs A and B which are executed in a first software system SS1 of the wireless device 100. The term "Software System" is used here for any environment with execution capability. This first software system may be proprietary or based on a commercially available real-time operating system, such as NOS, ISA, EPOC, JAVA, or WAP. Third party application programs X and are executed within an execution environment. This execution environment may limit the system capabilities available for the application programs, such as access to APIs (fixed, not dynamic behavior).

FIG. 3 shows the mobile user's privacy control feature. The privacy control feature enables the user to designate which application programs are granted access to the context awareness APIs 154 to utilize the current context information produced by the context inference engine 136. All requests or registrations by application programs A, B, X, and Y to have access to the Context Inference Engine 136, must first go through the Privacy Control block 150. Privacy Control block 150 uses the user's security data check stored in the Privacy Profile 152 to grant access rights to the requesting application programs. The user controls the granting of access rights by means of the user's security data input by the user through the user interface. The user's security data includes permissions list 155, Public Key Infrastructure (PKI) certificates 157, PKI trusted authority trust list 159, and flags set by the user for those application programs that have been authenticated by the PKI procedures, data set 161. The user can update the user's security data with the UPDATE PRIVACY FEATURES menu displayed by the wireless device 100 shown in FIGS. 5A and 5B. Access might be granted to an application program based on its digital signature, which is a part of the system applications, or other means known in the art. It is also possible to provide a separate system-wide Privacy User Interface to the privacy control 150, which can be employed by the mobile user to set the privacy policies and to alert the mobile user that an application program is attempting to register to receive the user's private context awareness information. The privacy control 150 and Privacy Profile 152 enable the mobile user to grant, deny, or revoke access, to grant access for a limited time, or to require an application program to always request registration before the user grants access.

In FIG. 3, the Context Inference Engine 136 in the wireless device 100 makes inferences from all the sensor inputs based on where the wireless device is located by the mobile user. For instance the inferred current context of the device 100 may be "IN THE USER'S POCKET", when a certain set of sensors input a specific combination of signals having a specific value range. As an example, the resulting inference of the current context by the Context Interference Engine 136 could be expressed in XML language format as follows:

<Context Inference Engine in Device>
   <device placement>pocket </device placement>
   <User Interface state>sleep mode </User Interface state>
   <device location>in elevator 5 building 1 floor 2 </device location>
   <API active actions>meeting starting on floor 3 room 322 </API active actions>
</Context Inference Engine in Device >

The Context Inference Engine 136 in the wireless device 100 can perform the context inference process with any of several methods. Different input information from the sensors can be weighted according to their relative value of importance appropriate for each environment condition or situation to be analyzed. Each sensor has it's own weight value. Alternatively, the weight values for each sensor for each environment condition can be learned from training sessions using, for example artificial neural networks (ANNs), self-organizing maps (SOMs), decision trees, fuzzy rule-based systems, or model-based systems such as Hidden Markov Modeling (HMM). Combinations of two or more of the alternate methods can be used, depending on the application.

The Context Inference Engine 136 can continuously adapt its weights through adaptive and continuous learning methods, where the user teaches the wireless device 100 new environment conditions and names them. Hidden Markov Modeling (HMM) can be used, for example, to implement an adaptive and continuous learning method for the Context Inference Engine 136. Alternately, the wireless device 100 can be programmed to spontaneously recognize a changed scene by comparing it with known scenes. The user can teach the wireless device new environmental conditions and name them, using the adaptive and automatic learning capability of neural networks. Adaptive and continuous learning methods are computationally intensive and are appropriate candidates to place on the network server 140, which assists the wireless device 100, as discussed below.

The field of context inference has applied the principles of automated pattern recognition to processing diverse types sensor inputs. Speech recognition has been applied to processing speech signals and handwriting recognition has been applied to processing hand force and accelerometer signals. In the field of robotics, image recognition has been applied to processing digitized still and motion images, mechanical location recognition has been applied to processing laser and sonar range finder signals, and mechanical motion recognition to has been applied to processing inertial, acceleration, and heading signals. In the field of prosthetic devices, touch recognition has been applied to processing tactile sensor signals. In the field of medicine, automated diagnostic programs recognize various pathologies by processing bio-electric field signals, as well as the more traditional pulse, respiration rate, and body temperature signals. These diverse sensor signal recognition processes have the common feature that an initial training stage is conducted where sampled signals are equated with a statistical model for those signals.

The principles of automated pattern recognition for these diverse sensor inputs are exemplified by the techniques for recognizing speech patterns. A common technique used in speech recognition is Hidden Markov Modeling (HMM). The term "Hidden" refers to the probabilistic and not directly observable events which underlie a speech signal. HMM speech recognition systems typically use realizations of phonemes which are statistical models of phonetic segments having parameters that are estimated from a set of training examples. Models of words are made by chaining or linking appropriate statistical models of phonetic segments. The statistical models serve as standards which are to be matched with the unknown voice signals to be recognized.

Recognition of unknown voice signals requires sampling and digitizing the speaker's spoken phonemes. These digitized phonemes are then processed into metadata. The metadata is then compared with the standard statistical models of phonemes. The most likely matches are then the inferred speech recognition result.

Recognition consists of finding the most likely path through the set of word models for the input speech signal. HMM speech recognition decoding systems first need to be trained through an iterative process. The system must be exposed to training examples or words of a particular speaker's voice. A training word is analyzed to generate a framed sequence of acoustic parameters or statistical models. A valid or "good" recognition occurs when the most likely path through the set of word models for the training word results in recognizing the correct training word.

Some useful references discussing the principles of Hidden Markov Models are:

Rabiner, L. R., "A tutorial on hidden Markov models and selected applications in speech recognition", *Proceedings of the IEEE*, volume 77, number 2, 1989, pages 257–286.

Rabiner, L. R. and Juang, B. H., "An introduction to hidden Markov models", *IEEE ASSP Magazine*, January 1986, pages 4–15.

Fraser, Andrew M. and Dimitriadis, Alexis, "Forecasting Probability Densities by Using Hidden Markov Models with Mixed States", *Time Series Prediction: Forecasting the Future and Understanding the Past*, Addison-Wesley, editor Weigend, Andreas S. and Gershenfeld, Neil A., 1994.

Charniak, Eugene, *Statistical Language Learning*, MIT Press, Cambridge, Mass., 1993.

To illustrate how Hidden Markov Modeling (HMM) can be extended beyond speech recognition, an example is given here for touch recognition. In the training stage for touch recognition, tactile sensor signals are input from touching a tactile transducer to a rough texture, such as for example sandpaper. The tactile sensor signals are transformed into a statistical model of the input signal. The statistical model is stored as a standard in a computer memory under the handle "rough_texture". To expand the range of sensor signals that are included in the model for "rough_texture", several training sessions can be conducted, each with a different direction or pressure for touching the sandpaper, resulting in several different samples of the statistical model. The set of samples of the statistical model are stored as a standard under the handle "rough_texture". Other training sessions are conducted with a smooth texture, such as glass. The tactile sensor signals input from touching the tactile transducer to the smooth texture are transformed into a statistical model of the input signal and stored as a standard under the handle "smooth_texture". Later, in the recognition mode, an unknown object is touched by the tactile transducer resulting in a sample tactile sensor signal. Recognition of unknown touch signals requires sampling and digitizing the touch transducer's signals. These digitized sensor signals are then processed into metadata. The metadata is then compared with the standard statistical models of "rough_texture" and "smooth_texture". The most likely match is then the inferred touch recognition result.

Combinations of two or more types of sensors can have their signals combined into an input metadata vector that characterizes a composite sampling event. The composite sampling event can be recognized using the principles of Hidden Markov Modeling (HMM). An example composite sampling event can be the state of the health and fatigue of the user of a wireless device 100. For example, a wireless device 100 can be equipped with a tactile transducer which outputs tactile sensor signals in response to the hand force and pulse rate of the user who is gripping the wireless device 100. The wireless device 100 can be equipped with a temperature sensor which outputs body temperature signals in response to the user gripping the wireless device 100. Hidden Markov Modeling (HMM) can be used to recognize a force/temperature input metadata vector that characterizes the combination of the hand force and the temperature sensor signals resulting from a sampling event. A composite sampling event in this example can have an extended duration so that the force sensor can transduce the pulse rate of the user over a period of time.

In the training stage, the tactile sensor signals and the force sensor signals are output while the user is in a condition of good health and resting normally. The tactile sensor signals and the force sensor signals are combined into a force/temperature input metadata vector which is transformed into a statistical model of the input signals. The statistical model is stored as a standard in the computer memory of the wireless device 100 under the handle "good_health_resting_normally". Other training sessions are conducted with the user in different states of health and fatigue. For example, the user may be training the wireless device 100 while working late at night at the office. The tactile sensor signals and the force sensor signals resulting from holding the wireless device 100, are combined into a force/temperature input metadata vector for the user in the condition of being in good health but fatigued. The force/temperature input metadata vector is transformed into a statistical model of the input signals and stored as a standard under the handle "good_health_fatigued".

Later, in the recognition mode, as the user holds the wireless device 100, the tactile sensor signals and the force sensor signals are sampled. The Health/Fatigue_State recognition consists of sampling and digitizing the touch transducer's signals. These digitized sensor signals are then processed into a metadata vector. The metadata vector is then compared with the standard statistical models of handle "good_health_resting_normally" and "good_health_fatigued". The most likely match is then the inferred touch recognition result.

In accordance with the feature, this recognition result can be used by a health maintenance application program in the wireless device 100, to provide useful and appropriate information to the user. For example, a health maintenance program can process the recognition result, and in response, signal an alarm to the user and provide suggestions for medications to palliate the sensed fatigue. One problem with automatic recognition programs is that they are either relatively large or they call databases that are relatively large in comparison to the memory capacity of the wireless device 100.

Another aspect of the feature is the recognition result can be used by a supplementary application program in a remote server, to provide additional and more detailed useful and appropriate information to the user. For example, the server can access a large database of suggestions for medications to palliate the sensed fatigue of the user. The results of the search of the database can be returned to the wireless device 100. The server can also maintain a personal profile of the user's characteristics and preferences and it can use that profile in automatically formulate its query to the database. For example, the user's drug allergies can be stored in the server's database, to insure that recommendations are not made that will result in an allergic reaction by the user to the suggested medication.

FIG. 3A is a functional block diagram of the wireless device 100, the server 140, and the web server 160, and their interaction when exchanging the metadata vector 138 and the privacy control data 150'. These exchanges are bulk encrypted with a symmetric session key, such as a Data Encryption Standard (DES) key, to protect the privacy of the data. To insure the integrity of the metadata vector 138 and the privacy control data 150', a message authentication code (MAC) can be computed and appended to the data, as described in the above referenced book by Stephen Thomas entitled *SSL and TLS*, published by John Wiley and Sons, 2000. To insure that the source of the metadata vector 138 and the privacy control data 150' cannot be repudiated, a digital signature can be appended to the data, as described in the above referenced book by Richard E. Smith entitled *Internet Cryptography*, published by Addison Wesley, 1997.

FIG. 3A shows the scope of the distributed context awareness implementation. The wireless device 100 has context sensitive applications A, B, X, and Y either downloaded or in firmware. The wireless device 100 may locally preprocess part of the context information in the metadata vector 138 before sending it to the context inference engine 142 in the network server 140 which is capable of processing the data and responding back with the resulting current context. The wireless device 100 may run application programs that require accessing the web service server 160 to provide context sensitive services to the mobile user.

FIG. 3A shows how processing of sensor data from the sensors in the wireless device 100, can be distributed between the wireless device and the network server 140. The operation in FIG. 3A is as follows:

1. The sensors continuously provide the sensor data to the Context Inference Engine 136 in the wireless device 100.
2. An application program that utilizes the context awareness APIs 154 may request the latest context information, or the application program may be registered to receive any changes to specific context information.
3. The Context Inference Engine 136 securely contacts the Context Inference Engine 142 of the network server 140 and sends the metadata vector 138 to the server 140. Depending on the sensors and the implementation details, Context Inference Engine 136 may preprocess part of the sensor data in the metadata vector 138 prior to sending it. Depending on the sensors and the interval for processing, there may be virtual connection open between Context Inference Engine 136 and Context Inference Engine 142 for frequent data exchanges. Context Inference Engine 142 at the network server 140, has the processing power and memory capacity to handle computationally intensive and/or memory intensive processing of the preprocessed sensor data in the metadata vector 138 to produce the current context result information.
4. Context Inference Engine 142 at the network server 140 may utilize local user information (history information, customer details) stored in the user database 146 for making a more accurate determination of the mobile user's current context.
5. Context Inference Engine 142 at the network server 140 then securely returns the current context awareness information to Context Inference Engine 136 in the wireless device 100.
6. Context Inference Engine 136 in the wireless device 100 then provides the current context awareness information through Context Awareness APIs 154 to the application programs registered for to receive that information.

FIG. 3A shows how Web Services in Web Service Server 160 are enabled to receive current context results of the wireless device 100. Web Services Server 160 has a software system for server application program A and an execution environment for server application programs X and Y that are similar to the software system SS1 and execution environment (Exec. Env.) in the wireless device 100 shown in FIG. 3. Server Application programs A, X, and Y in Web Service Server 160 may require access through the Context Awareness APIs 178 to provide Web Services with the current context of the wireless device 100.

In FIG. 3A, Web Service Server 160 uses the Context Inference Client 176 to contact the Context Inference Server 174 in the network server 140. Context Inference Client 176 may utilize customer database information in database 184 to enhance the context sensitivity capabilities of the web server 160. The contact to the network server 140 is done through a context awareness interface 186 to the Context Inference Server 174 in the network server 140.

Context Inference Server 174 registers the Web Services of the web server 160 through the privacy control 164 of the network server 140 to the Context Inference Engine 142. Privacy control 164 has a cached copy 144 of the Privacy Profile 152 of the wireless device 100. This enables processing of the privacy check in the network Server 140 for access requests from web server 160. The communication between web server 160 and network server 140 is secured using the Internet secure protocols such as HTTPS or SSL. The Context Inference Server 174 can publish its own service as a Web Service to other Web Services on the Internet, in which case the implementation of the interface 186 between web server 160 and network server 140 can be Extensible Markup Language (XML) messages carried in the Simple Object Access Protocol (SOAP) messaging protocol.

The Context inference Engine 142 in the network server 140 will receive processed sensor metadata vector 138 information and possibly some application API information originated from the Context Inference Engine 136 of the wireless device 100. The Context inference Engine 142 of the network server has user database 146 information of the behavior of the user and of the past usage of the wireless device. The Context inference Engine 142 of the network server may also have third party services available (such as instances offering content and/or services) to be offered to potential users. What is offered to the user can also depend on the user profile 144. The nature of the Context inference Engine 136 information of the wireless device 100 that is conveyed to the Context inference Engine 142 of the network can be controlled with the privacy control 150 that is managed by the user of the wireless device 100. The user may thus fully or partly disable the Context inference Engine 142 of the network to control the amount of his/her information that can be used by third party services. The privacy control 150 enables the user to control access by anyone to his/her private information.

The Context inference Engine 136 of the wireless device receives an input from the API interface 154 from the applications A, B, X, or Y located in the wireless device 100. An example would be from a calendar application program indicating that a meeting is starting in 25 minutes time. As another example the calendar application program indicates that Lisa is having a birthday tomorrow into which you are participating. The Context inference Engine 136 of the wireless device can convey processed result information to the Context inference Engine 142 of the network server. Now in addition to the sensor information, information from the application programs A, B, X, or Y can also be used in the decision making of the Context inference Engine 136 of the wireless device. A combination of the sensor information and information coming from the application programs A, B, X, or Y can be processed by the Context inference Engine 136. The user's behavior or usage patterns can be detected from the sensor and recorded in a the user database, concerning the usage of the application programs. As previously discussed, the processing of this combined information from the sensors and from the application programs can be shared between the Context inference Engine 136 and the Context inference Engine 142.

The information transfer from the Context inference Engine 136 of the wireless device to the Context inference Engine 142 of the network server can be done in alternative ways. The system can be managed so that the current consumption and transfer capacity between the wireless device 100 and the network server 140 is taken into account. The context information does not always have to be collected so frequently that it would have to be periodically transferred to the network side 140 every few seconds. Depending on the application, the timing window applied to information transfer from the Context inference Engine 136 of the wireless device 100 to the Context inference Engine 142 of the server 140 can vary from seconds to minutes. If there were no event change or condition change in the environment of the wireless device 100, there would be no need to transfer information to the Context inference Engine 142 of the server 140. Additionally information can be temporarily stored in a buffer in the wireless device 100, which can then transferred less frequently to the network Context inference Engine 142. Packet based GPRS and UMTS can support the less frequent information transfer rates. Also, it is advantageous to send the network Context inference Engine 142 information from the wireless device 100 as an attachment, immediately subsequent to other signaling made to in the network direction from the wireless device 100, thus saving the radio transmitter of the wireless device 100 from having to be switched on again for transferring the Context inference Engine 136 information separately to the network server 140.

Returning to FIG. 1, the relationship is shown between the network server 140, the Universal Description, Discovery and Integration (UDDI) registry 170, and a plurality of web site servers 160. UDDI is a defacto standard for an Internet-based registry. The UDDI registry 170 enables the network server 140 to discover new web sites for services and businesses on the Internet. Once such services and businesses are identified by the UDDI registry 170 to the network server 140, then the server 140 must apply the mobile user's cached privacy profile 144 in FIG. 3A, in order to prevent unauthorized access of the user's private data by application programs on the newly discovered web sites.

FIG. 3B is a network process flow diagram of the interaction of the wireless device 100 I the first column, network server 140 in the middle column, and web server 160 in the right column, when they carry out the determination of the current context of the wireless device 100. The process begins with the wireless device 100 in step 302:

Step 302: PRIVACY CONTROL 150 IN WIRELESS DEVICE 100 SENDS UPDATED PRIVACY PROFILE TO NETWORK SERVER 140.

Then the network server 140 continues with step 304:

Step 304: NETWORK SERVER 140 UPDATES CACHED PRIVACY PROFILE 144.

The wireless device 100 continues with the following steps 306, 308, and 310:

Step 306: SENSORS CONTINUOUSLY PROVIDE SENSOR DATA TO CONTEXT INFERENCE ENGINE 136 IN WIRELESS DEVICE 100.

Step 308: APPLICATION PROGRAM THAT USES CONTEXT AWARENESS API 154 REQUESTS LATEST CONTEXT INFORMATION.

Step 310: CONTEXT INFERENCE ENGINE 136 CONTACTS CONTEXT INFERENCE ENGINE 142 OF THE NETWORK SERVER 140 AND SENDS THE METADATA VECTOR 138 TO SERVER 140.

Then the network server 140 continues with steps 312 and 314:

Step 312: CONTEXT INFERENCE ENGINE 142 AT NETWORK SERVER 140 USES LOCAL USER INFORMATION STORED IN USER DATABASE 146 TO MAKE A MORE ACCURATE DETERMINATION OF THE MOBILE USER'S CURRENT CONTEXT.

Step 314: NETWORK SERVER 140 REQUESTS DATA FROM WEB SERVER 160.

THE NETWORK SERVER'S ACCESS IS AUTHORIZED BY CACHED PRIVACY PROFILE 144 IN NETWORK SERVER.

Then the web server 160 continues with step 316:

Step 316: WEB SERVER PROVIDES USER INFORMATION STORED IN DATABASE 184 TO NETWORK SERVER 140.

Then the network server 140 continues with step 318:

Step 318: CONTEXT INFERENCE ENGINE 142 AT THE NETWORK SERVER 140 THEN SECURELY RETURNS THE CURRENT CONTEXT AWARENESS INFORMATION TO CONTEXT INFERENCE ENGINE 136 IN THE WIRELESS DEVICE 100.

Then the wireless device 100 finishes with step 320:

Step 318: CONTEXT INFERENCE ENGINE 136 IN THE WIRELESS DEVICE 100 THEN PROVIDES THE CURRENT CONTEXT AWARENESS INFORMATION THROUGH CONTEXT AWARENESS APIs 154 TO THE APPLICATION PROGRAMS REGISTERED TO RECEIVE THAT INFORMATION.

Figure 4:
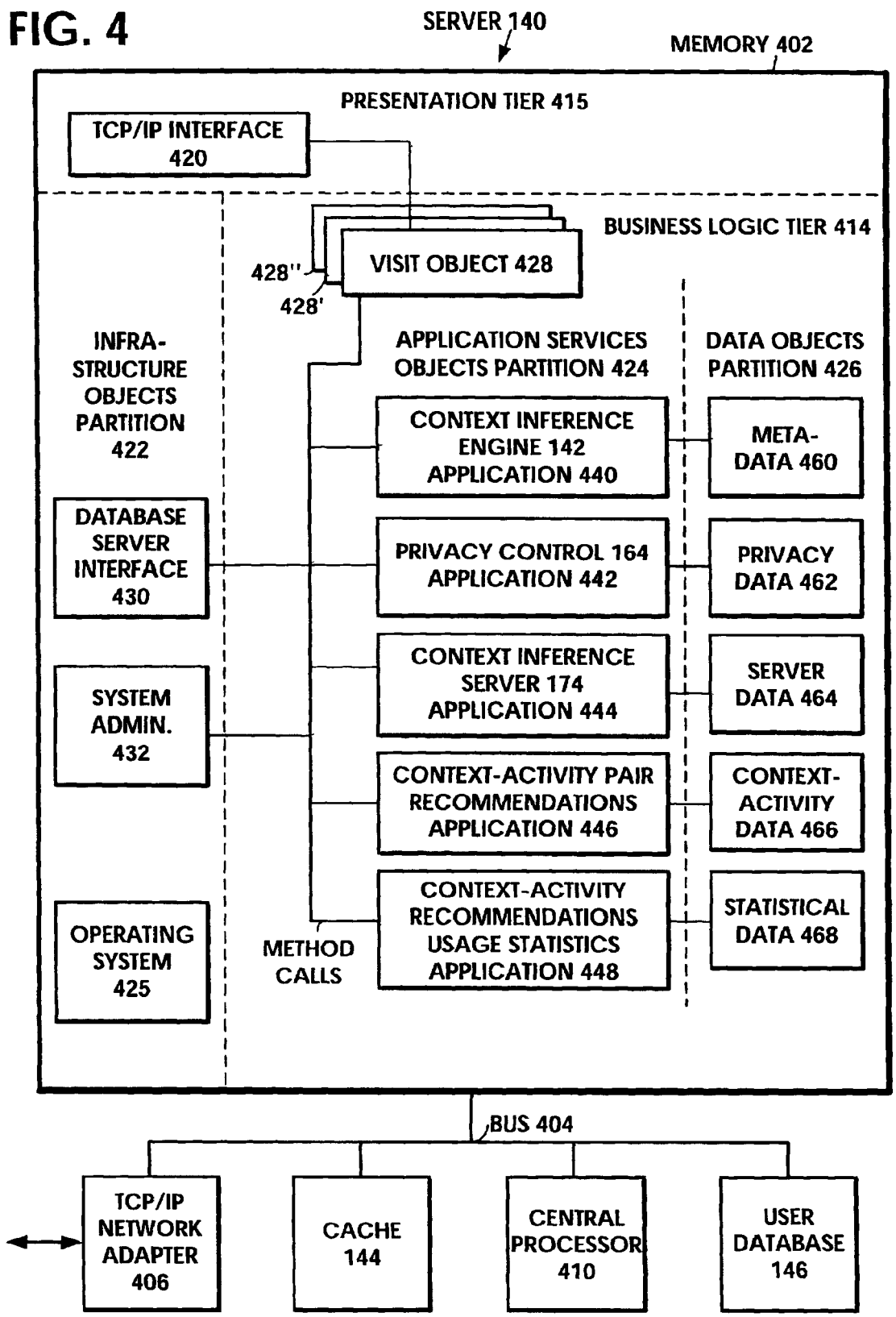
FIG. 4 is a functional block diagram of the network server 140, showing the memory storing the application services software programs needed to perform the operations of the invention.

FIG. 4 is a functional block diagram of the network server 140, showing the memory 402 storing the application services software programs needed to perform the operations of the feature. The memory is connected by the bus 404 to the cache 144, user database 146, TCP/IP network adapter 406, and central processor 410. The memory 402 stores programs which are sequences of executable instructions which, when executed by the processor 410, carry out the methods of the feature.

FIG. 4 is a functional block diagram of the network server, showing the memory storing the application services software programs needed to perform the operations of an embodiment of the feature. FIG. 4 discloses the functional components of an exemplary network server 140 arranged as an object model. The object model groups the object oriented software programs into components that perform the major functions and applications in network server 140. The object model for memory 402 of network server 140 employs a three-tier architecture that includes presentation tier 415, infrastructure objects partition 422, and business logic tier 414. The object model further divides business logic tier 414 into two partitions, application objects partition 422 and data objects partition 426.

Presentation tier 415 retains the programs that manage the device interfaces to network server 140. In FIG. 4, presentation tier 415 includes network interface 420. A suitable implementation of presentation tier 415 may use Java servlets to interact with WAP protocol gateway 120 via the hypertext transfer protocol ("HTTP"). The Java servlets ran within a request/response server that manages the exchange of messages between WAP protocol gateway 120 and network server 140. A Java servlet is a Java program that runs within a Web server environment. A Java servlet takes a request as input, parses the data, performs logic operations, and issues a response back to WAP protocol gateway 120. The Java runtime platform pools the Java servlets to simultaneously service many requests. Network interface 420 accepts request messages from WAP protocol gateway 120 and passes the information in the request to visit object 428 for further processing. Visit object 428 passes the result of that processing to network interface 420 for transmission back to the WAP protocol gateway 120. Network interface 420 may also use network adapter 406 to exchange data with another user device.

Infrastructure objects partition 422 retains the programs that perform administrative and system functions on behalf of business logic tier 414. Infrastructure objects partition 422 includes operating system 425, and an object oriented software program component for database server interface 430, and system administrator interface 432.

Business logic tier 414 in FIG. 4 includes multiple instances of visit object 428, 428', 428". A separate instance of visit object 428 exists for each network interface 420 session. Each visit object 428 is a stateful session object that includes a persistent storage area from initiation through termination of the session, not just during a single interaction or method call. The persistent storage area retains information associated with the session.

When WAP protocol gateway 120 sends a metadata vector 138 message to network server 140, the message is sent to network interface 420 to invoke a method that creates visit object 428 and stores connection information as a state in visit object 428. Visit object 428 may, in turn, invoke a method in context inference engine 142 application 440 to perform a context inference on the metadata vector and return a current context result.

When WAP protocol gateway 120 sends a privacy control data 150' message to network server 140, the message is sent to network interface 420 to invoke a method that creates visit object 428 and stores connection information as a state in visit object 428. Visit object 428 may, in turn, invoke a method in privacy control 164 application 442 to update the cached privacy profile 144.

When WAP protocol gateway 120 sends a context-activity pair message 190 to network server 140, the message is sent to network interface 420 to invoke a method that creates visit object 428 and stores connection information as a state in visit object 428. Visit object 428 may, in turn, invoke a method in context-activity pair recommendations application 446. Application 446 compares four types of activities in the context-activity pairs received from the wireless device 100, with the recommendations in the database 192: [1] past recommendations, [2] past services used, [3] pre-stored service preferences, and [4] special requested service requirements. Application 446 may, in turn make a method call to context-activity recommendations usage statistics application 448.

A description of server programming applications developed with Enterprise Java Beans is provided in the book by Ed Roman entitled *Mastering Enterprise Java Beans*, published by John Wiley and Sons, 1999. A description of the use of an object model in the design of server applications is provided in the book by Matthew Reynolds entitled *Beginning E-Commerce*, Wrox Press Inc., 2000, (ISBN: 1861003986). Java servlets and the development of web site servers is described in the book by Duane K. Fields, et al. entitled *Web Development with Java Server Pages*, published by Manning Publications Co., 2000.

Example Wireless Application Protocol (WAP) Embodiment of the Invention

The user's Wireless Application Protocol (WAP)-enabled portable wireless device 100 accesses a small file called a deck which is composed of several smaller pages called cards which are small enough to fit into the display area of the device's microbrowser 102. The small size of the microbrowser 102 and the small file sizes accommodate the low memory constraints of the portable wireless device 100 and the low-bandwidth constraints of a wireless network 116. The cards are written in the Wireless Markup Language (WML) which is specifically devised for small screens and one-hand navigation without a keyboard. The WML language is scaleable from two-line text displays on the microbrowser 102 of a cellular telephone, up through large LCD screens found on smart phones and personal communicators. The cards written in the WML language can include programs written in WMLScript, which is similar to JavaScript, but makes minimal demands on memory and CPU power of the device 100 because it does not contain many of the unnecessary functions found in other scripting languages.

The Nokia WAP Client Version 2.0 is a software product containing the components necessary to implement the WAP client on the wireless device 100. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless PDAs. Application programs 106 stored in the wireless device 100 interact with the WAP Client to implement a variety of communications applications. Details of the Nokia WAP Client Version 2.0 can be found in the online paper: *Nokia WAP Client Version 2.0, Product Overview*, Nokia Internet Communications, 2000, www.nokia.com/corporate/wap.

The WAP Client includes the Wireless Public Key infrastructure (PKI) feature, providing the infrastructure and the procedures required for authentication and digital signatures for servers and mobile clients. Wireless PKI is a certificate-based system that utilizes public/private key pairs associated with each party involved in a mobile transaction. Wireless Identity Module (WIM) is a security token feature of the WAP Client, which includes security features, such as the public and private keys and service certificates, needed for user authentication and digital signatures. Additionally, it has the ability to perform cryptographic operations to encrypt and decrypt messages.

The WAP protocol gateway 120 links the Internet 130 and the wireless network 116. The WAP protocol gateway 120 includes the Wireless Public Key infrastructure (PKI) feature to help provide a secure Internet connection to the wireless device 100. The WAP protocol gateway 120 enables the WAP-enabled wireless device 100 to access Internet applications such as headline news, exchange rates, sports results, stock quotes, online travel and banking services, or to download distinctive ringing tones.

The user's WAP-enabled portable wireless device 100 communicates with the wireless access point 114 and can exchange messages for distances up to several kilometers. The types of wireless networks 116 supported by the WAP standard include Cellular Digital Packet Data (CDPD), Code-Division Multiple Access (CDMA), Global System for Mobile Communications (GSM), Time Division Multiple Access (TDMA), GPRS, 3G-Broadband, and the like.

The overall process of communication between the user's WAP-enabled wireless device (the client) 100, through the WAP protocol gateway 120, to the server 140 resembles the way Web pages are served on the Internet using the HyperText Transfer Protocol (HTTP) or World Wide Web protocol:

[1] The user presses a phone key on the user's device 100 related to the Uniform Resource Locator (URL) of the server 140.

[2] The user's device 100 sends the URL, via the wireless access point 114 and the wireless network 116, to the gateway 120 using WAP protocols.

[3] The gateway 120 translates the WAP request into an HTTP request and sends it over the Internet 130 to the server 140, via Transmission Control Protocol/Internet Protocol (TCP/IP) interfaces.

[4] The server 140 handles the request just like any other HTTP request received over the Internet. The server 140 either returns a WML deck or a HyperText Markup Language (HTML) page back to the gateway 120 using standard server programs written, for example in Common Gateway Interface (CGI) programs, Java servlets, or the like.

[5] The gateway 120 receives the response from the server 140 on behalf of the user's device 100. If the response is an HTML page, it gets transcoded into WML if necessary. Then the WML and WMLScript coding is encoded into a byte code that is then sent to the user's device 100.

[6] The user's device 100 receives the response in the WML byte code and displays the first card in the deck on the microbrowser 102 to the user.

In FIG. 1, the protocol gateway 120 includes a WAP protocol stack organized into five different layers. An application layer is the wireless application environment, which executes portable applications and services. A session layer is the wireless session protocol, which supplies methods for the organized exchange of content between client/server applications. A transaction layer is the wireless transaction protocol, which provides methods for performing reliable transactions. A security layer is the wireless transport layer security, which provides authentication, privacy, and secure connections between applications. The transport layer is the wireless datagram protocol, which shelters the upper layers from the unique requirements of the diverse wireless network protocols, such as CDPD, CDMA, GSM, etc. Additional information about the WAP standard and the WAP protocol stack can be found in the book by Charles Arehart, et al. entitled, *Professional WAP*, published by Wrox Press Ltd., 2000 (ISBN 1-861004-04-1).

Alternate Embodiment of the Invention

FIGS. 5A and 5B show an alternate embodiment of the user's wireless device with the UPDATE PRIVACY FEATURES sub menu of the recommendation web services menu. FIGS. 5A and 5B will be discussed further below. FIGS. 5C and 5D show the user's wireless device with the MANAGE CONTEXT-ACTIVITY PROFILE sub menu of the recommendation web services menu. The MANAGE CONTEXT-ACTIVITY PROFILE sub menu offers the user the option of managing preference values for the following categories:

(1) AUTOMOBILE
  (a) day time radio preferences
  (b) night time radio preferences
  (c) map display preferences
  (d) service station preferences
(2) DINING
  (a) restaurant preferences
  (b) food preferences
(3) ENTERTAINMENT
  (a) movie preferences
  (b) sports preferences
(4) TRAVEL
  (a) weather forecasts
  (b) airline preferences
  (c) hotel preferences
  (d) car rental preferences If the user selects the option of (c) REQUEST A RECOMMENDATION, from the recommendation web services menu of FIG. 1, then the REQUEST A RECOMMENDATION sub menu is displayed on the wireless device, as is shown in FIGS. 5E and 5F. The options presented to the user in the REQUEST A RECOMMENDATION sub menu are activity categories. The activity categories are displayed as follows:

(1) AUTOMOBILE ACTIVITIES
  (a) request day time radio recommendation
  (b) request night time radio recommendation
  (c) request map recommendation
  (d) request service station recommendation
(2) DINING ACTIVITIES
  (a) request restaurant recommendation
  (b) request food recommendation
(3) ENTERTAINMENT ACTIVITIES
  (a) request movie recommendation
  (b) request sports recommendation
(4) TRAVEL ACTIVITIES
  (a) request weather forecasts
  (b) request airline recommendation
  (c) request hotel recommendation
  (d) request car rental recommendation If the user selects the option of DINING ACTIVITIES and specifically "request restaurant recommendation" in the browser 102 of FIG. 5E, then the wireless device 100 proceeds to interact with the network server 140, to produce the result of the browser 102 displaying the page shown in FIG. 5G. As is seen in FIG. 5G, the user selected activity of "DINING-restaurant" is coupled with the context that the wireless device 100 determines to exist at the present time in the vicinity of the wireless device 100. The activity coupled with a description of the current context, is transmitted from the wireless device 100 to the network server 140. There at the server 140, context-activity pairs in the database 192 are approximately matched to the current context-activity pair received from the device 100, and the server accesses associated recommendations that are stored in the database 192. The associated recommendations are then transmitted back to the device 100. This operation will be discussed in greater detail in connection with FIG. 3C below.

The resulting invention provides a distributed recommendation system having greater privacy for the user's private data. The invention distributes the tasks of a recommendation system between wireless devices and network servers, so as to protect the privacy of end users. The invention provides greater privacy for context-sensitive, adaptive, user interfaces for Internet service usage by wireless devices.

Although a specific embodiment of the feature has been disclosed, it will be understood by those having skill in the art that changes can be made to the specific embodiment without departing from the spirit and the scope of the feature.

What is claimed is:

1. A computer program product to enable a wireless device to provide recommendations to its user that are appropriate to the device's current environment, comprising:

a computer readable medium;

program code in said computer readable medium for characterizing a current environment of the wireless device with a current context result;

program code in said computer readable medium for forming a context-activity pair by selecting an activity and pairing it with the current context result;

program code in said computer readable medium for accessing a database of recommendations using the context-activity pair without including any user personal data program code in said computer readable medium for providing recommendations to the wireless device from the database of recommendations;

program code receiving the related recommendations at the wireless device for presentation to the user;

program code for receiving sensor signals characterizing a current environment of the wireless device;

program code for processing the sensor signals with a context inference engine to produce a current context result;

program code for accessing related service history items from a history log;

program code for forming context-activity pair information from the current context result and the related service history items;

program code for searching a database of recommendations using the context-activity pair information; and program code for automatically providing recommendations to the user in response to the searching step wherein the program code for accessing related service history items from a history log comprises accessing several component databases including past recommendations and context; past services used and contexts; prestored service preferences and special requested service requirements.

2. The medium of claim 1 wherein program code for forming context-activity pair information from the current context result and the related service history items comprises any combination of activities with appropriate recommendations and without user identification.

3. The medium of claim 1 wherein the recommendation further comprises information of activity histories or preferences of numerous users made or created by a server.

4. A method to enable a wireless device to automatically provide recommendations to its user that are appropriate to the device's current environment, comprising:

automatically processing in a mobile wireless device, sensor signals characterizing a current environment, to produce a current context result;

storing in a history log in the wireless device, related service history items, including past recommendations received by the wireless device and past services used by the user of the wireless device;

forming context-activity pair information in the wireless device, from the current context result and the related service history items;

transmitting the context-activity pair information to a wireless network server, for searching recommendations related to the current context result and the related service history items;

automatically transmitting the current context result in a message over a wireless network to the wireless network server;

including in the message, a unique operating code to enable the wireless network server to respond with information corresponding to the unique operating code, the information being similar recommendations in its database related to said past recommendations and context; past services used and contexts; prestored service preferences and special requested service requirements received by the wireless device wherein transmitting the current context in a message comprises several types of messages, each of which is distinguished by its own unique operation code; and receiving the related recommendations at the wireless device for presentation to the user;

5. The method of claim 4, wherein said related service history items from a history log comprises:

past recommendations received by the wireless device.

6. The method of claim 4, wherein said related service history items from a history log comprises:

past services used by the user of the wireless device.

7. The method of claim 4, wherein said related service history items from a history log comprises:

prestored service preferences entered by the user.

8. The method of claim 4, wherein said related service history items from a history log comprises:

special requested service requirements entered by the user.

9. The method of claim 4, wherein said transmitting step further comprises:

automatically transmitting the current context in a message over a wireless network to the network server; and including in the message, the unique operating code to enable the wireless network server to respond with information corresponding to the unique operating code, the information being similar recommendations in its database related to said past services used by the user of the wireless device.

10. The method of claim 4 wherein said transmitting step further comprises:

automatically transmitting the current context in a message over a wireless network to the wireless network server; and including in the message, a unique operating code to enable the wireless network server to respond with information corresponding to the unique operating code, the information being similar recommendations in its database related to both said past recommendations received by the wireless device and said past services used by the user of the wireless device.

11. The method of claim 4, wherein said receiving step further comprises:

receiving information customized to the user's perceived interests, the information being related to the current context.

12. The method of claim 4, wherein said receiving step further comprises:

receiving recommendations that have been made in the past to other users in similar contexts.

13. The method of claim 4, wherein said receiving step further comprises:

receiving recommendations based on past services used by other users.

14. The method of claim 4 wherein the unique operating code comprises:

designating the message as a manual request or containing the current context or an automatic spontaneous message.

* * * * *